US008392246B2

(12) United States Patent
Coladonato et al.

(10) Patent No.: US 8,392,246 B2
(45) Date of Patent: *Mar. 5, 2013

(54) ADVERTISER AD REVIEW

(75) Inventors: Greg Coladonato, Palo Alto, CA (US); Juliana Jaeger, Mountain View, CA (US); Karen Padham Taylor, Los Gatos, CA (US); Elad Gil, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 762 days.

This patent is subject to a terminal disclaimer.

(21) Appl. No.: 12/121,266

(22) Filed: May 15, 2008

(65) Prior Publication Data
US 2009/0063229 A1 Mar. 5, 2009

Related U.S. Application Data

(60) Provisional application No. 60/969,085, filed on Aug. 30, 2007.

(51) Int. Cl.
*G06Q 40/00* (2012.01)
(52) U.S. Cl. ................................... 705/14.26
(58) Field of Classification Search ...... 705/14
See application file for complete search history.

(56) References Cited

U.S. PATENT DOCUMENTS

| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,985,882 B1 | 1/2006 | Del Sesto |
| 7,039,599 B2 | 5/2006 | Merriman |
| 7,136,875 B2 | 11/2006 | Anderson et al. |
| 8,069,075 B2 * | 11/2011 | Santos et al. ............... 705/7.29 |
| 8,112,403 B2 * | 2/2012 | Repasi et al. ............... 707/705 |
| 2004/0176992 A1 * | 9/2004 | Santos et al. .................. 705/10 |
| 2004/0204983 A1 | 10/2004 | Shen et al. |
| 2005/0021396 A1 * | 1/2005 | Pearch et al. ................. 705/14 |
| 2005/0222902 A1 | 10/2005 | Coit et al. |
| 2005/0251399 A1 | 11/2005 | Agarwal et al. |
| 2006/0149623 A1 * | 7/2006 | Badros et al. ................. 705/14 |

(Continued)

FOREIGN PATENT DOCUMENTS
WO WO97/21183 6/1997

OTHER PUBLICATIONS

U.S. Appl. No. 95/001,073, Reexamination of Stone et al., filed Sep. 30, 2004.

(Continued)

*Primary Examiner* — Daniel Felten
*Assistant Examiner* — Clifford Madamba
(74) *Attorney, Agent, or Firm* — Armstrong Teasdale LLP

(57) ABSTRACT

A review for a content publisher is received, the content publisher publishing content to which advertisements are targeted over a distribution network. An aggregated approval score for the content publisher is generated based on the received review and other reviews for the content publisher. The aggregated approval score is provide to an advertiser. An indication to accept or reject the targeting of the advertisements to the publisher content is received, the indication being received after providing the aggregated approval score to the advertiser.

18 Claims, 11 Drawing Sheets

U.S. PATENT DOCUMENTS

| | | | |
|---|---|---|---|
| 2007/0005417 A1 | 1/2007 | Desikan et al. | |
| 2007/0005418 A1* | 1/2007 | Nishar et al. | 705/14 |
| 2007/0027765 A1* | 2/2007 | Collins et al. | 705/14 |
| 2008/0154717 A1* | 6/2008 | Saifee et al. | 705/14 |
| 2008/0288348 A1 | 11/2008 | Zeng et al. | |

OTHER PUBLICATIONS

U.S. Appl. No. 95/001,061, Reexamination of Stone et al., filed Sep. 3, 2002.

U.S. Appl. No. 95/001,069, Reexamination of Dean et al., filed Jul. 11, 2002.

U.S. Appl. No. 95/001,068, Reexamination of Stone et al., filed Dec. 7, 2002.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www.Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

International Search Report for PCT/US2008/074823, dated Apr. 24, 2009 (11 pages).

European Search Report in Application No. 08828268.6 mailed Aug. 18, 2011, 2 pages.

International Search Report for PCT/US2008/074825, dated Mar. 19, 2009 (3 pages).

Written Opinion of the International Searching Authority for PCT/US2008/074825, date Mar. 19, 2009 (5 pages).

* cited by examiner

| New Ads | Approved Ads | Disapproved Ads | Approved Advertisers | Disapproved Advertisers |

| Advertiser | 530 Approval Type | 540 Approval Date |
|---|---|---|
| East Coast Auto Supply<br>*Ad* 520<br>510 {<br>512 — Brand-Damaging Advertiser: 0%<br>514 — Offensive/Racy Ad: 0%<br>516 — Low Production Value: 45% | Manually Approved | 07-01-2007 |

Save

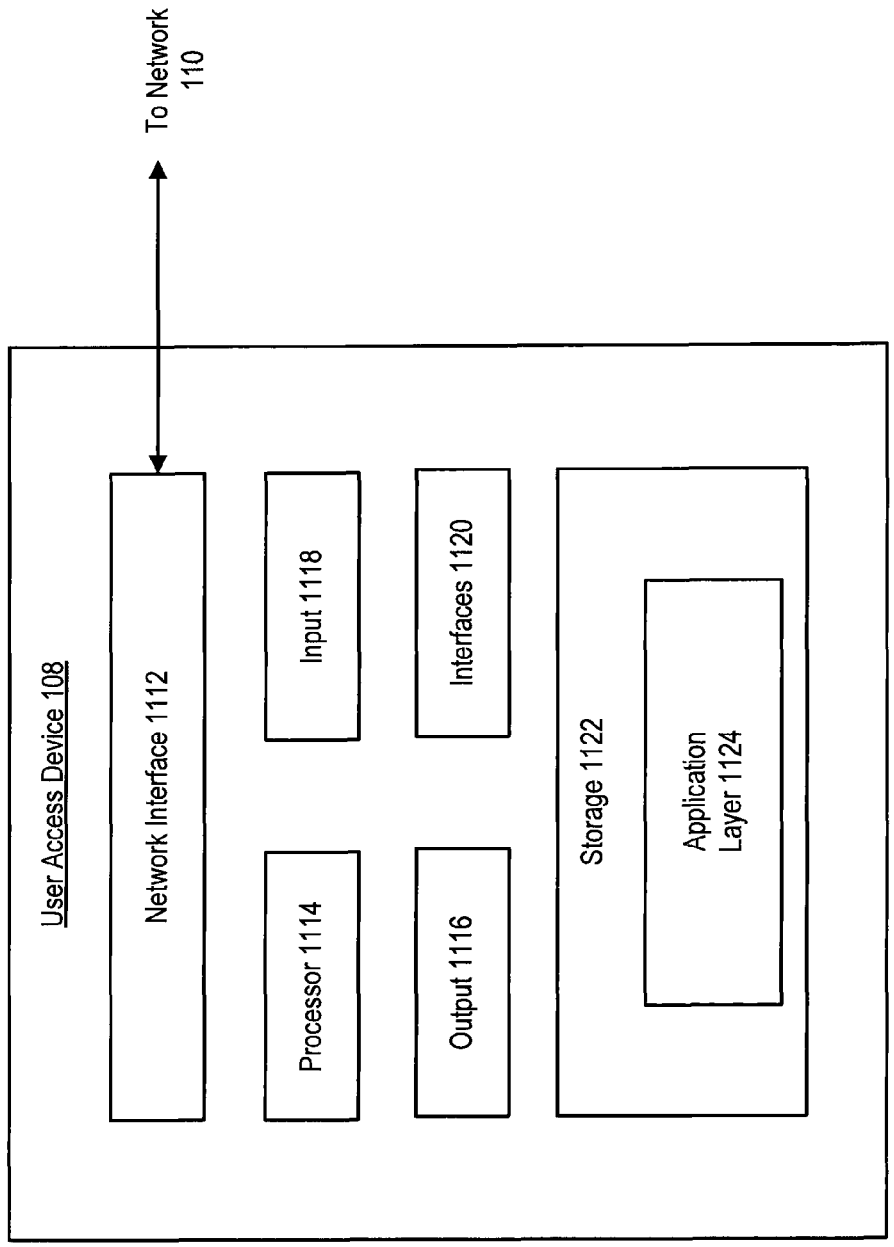

ADVERTISER AD REVIEW

CROSS-REFERENCE TO RELATED APPLICATION

This application claims priority to U.S. Provisional Patent Application Ser. No. 60/969,085 filed Aug. 30, 2007, and entitled "CONTROLLING ADVERTISEMENTS BASED ON AGGREGATED SCORES," the contents of which are incorporated herein by reference.

BACKGROUND

Advertising through interactive media is gaining popularity, with the Internet in particular becoming a dominant advertising medium. Internet users often search the internet for products and services, and advertisers frequently use the Internet to target audiences interested in available products and services.

One form of interactive media advertising involves distributing advertisements ("ads") to online publishers (e.g., an online newspaper) for display with publisher content. For example, advertisements for an automobile manufacturer can be displayed with publisher content (e.g., a publisher's web page), in order to drive online customers to the manufacturer website. In this advertising model, publishers and advertisers may be concerned with advertisement control and transparency. If publishers and advertisers lack control over the distribution of advertisements, the publishers and advertisers may be unwilling to participate in this advertising model. Certain publishers may also be concerned with the quality of the advertisements or advertisers and may not be willing to allow un-reviewed ads to be displayed with publisher content.

SUMMARY

In one general aspect, a computer-implemented method involves receiving a review for an advertisement, the advertisement to be provided to recipients over a distribution network with content provided by content publishers. The method involves generating an aggregated approval score for the advertisement based on the received review and other reviews for the advertisement. The method involves providing the aggregated approval score to a content publisher and receiving, from the content publisher, an indication to accept or reject the advertisement for presentation with content provided to recipients by the content publisher. The indication is received after providing the aggregated approval score to the content publisher.

In another general aspect, a computer-implemented method involves receiving, from online publishers, publisher reviews for an advertiser, the advertiser providing online advertisements for display with content associated with the online publishers. The method involves aggregating the publisher reviews for the advertiser and generating an aggregated approval score for the advertiser based on the aggregated publisher reviews. The method involves presenting the aggregated approval score to the online publishers and receiving, from an online publisher, an indication to accept or reject an online advertisement from the advertiser based on the aggregated approval score for the advertiser.

In another general aspect, a computer-implemented method involves receiving an advertisement targeting request from an advertisement distribution network. The targeting request includes information associated with content requested from a content publisher. The method involves identifying relevant advertisements to target to the requested content based on the targeting request. The method involves applying approval decision filtering to the identified relevant advertisements. The approval decision filtering reflects approval decisions to accept or reject advertisements for presentation with the requested content, the approval decisions being received from the content publisher after providing aggregated ratings of the advertisements to the content publisher. The method involves serving the identified relevant advertisements to the requested content based on results of the approval decision filtering.

In another general aspect, a system comprises means for receiving a review for an advertisement, the advertisement to be provided to recipients over a distribution network with content provided by content publishers. The system comprises means for generating an aggregated approval score for the advertisement based on the received review and other reviews for the advertisement. The system comprises means for providing the aggregated approval score to a content publisher and means for receiving, from the content publisher, an indication to accept or reject the advertisement for presentation with content provided to recipients by the content publisher. The indication is received after providing the aggregated approval score to the content publisher.

In another general aspect, a computer readable medium stores a computer program. The computer program includes instructions that, when executed, cause at least one processor to: receive a review for an advertisement, the advertisement to be provided to recipients over a distribution network with content provided by content publishers; generate an aggregated approval score for the advertisement based on the received review and other reviews for the advertisement; provide the aggregated approval score to a content publisher; and receive, from the content publisher, an indication to accept or reject the advertisement for presentation with content provided to recipients by the content publisher, the indication being received after providing the aggregated approval score to the content publisher.

In another general aspect, a computer-implemented method involves receiving a review for a content publisher, the content publisher publishing content to which advertisements are targeted over a distribution network. The method involves generating an aggregated approval score for the content publisher based on the received review and other reviews for the content publisher. The method involves providing the aggregated approval score to an advertiser and receiving, from the advertiser, an indication to accept or reject the targeting of the advertisements to the publisher content. The indication is received after providing the aggregated approval score to the advertiser.

In another general aspect, a computer-implemented method involves receiving an advertisement targeting request from an advertisement distribution network. The targeting request includes information associated with content available from an online content publisher. The method involves identifying relevant advertisements to target to the content based on the targeting request, the identified advertisements being associated with online advertisers. The method involves applying approval decision filtering to the identified relevant advertisements. The approval decision filtering reflects approval decisions to accept or reject advertisements for presentation with the content, the approval decisions being received from the advertisers after providing aggregated ratings of the online content publisher to the advertisers. The method involves serving the identified relevant advertisements to the content based on results of the approval decision filtering.

In another general aspect, a system comprises means for receiving a review for a content publisher, the content publisher publishing content to which advertisements are targeted over a distribution network. The system comprises means for generating an aggregated approval score for the content publisher based on the received review and other reviews for the content publisher. The system comprises means for providing the aggregated approval score to an advertiser and means for receiving, from the advertiser, an indication to accept or reject the targeting of the advertisements to the publisher content. The indication is received after providing the aggregated approval score to the advertiser.

In another general aspect, a system comprises an advertisement management system. The advertisement management system is configured to receive a review for a content publisher, the content publisher publishing content to which advertisements are targeted over a distribution network. The advertisement management system is configured to generate an aggregated approval score for the content publisher based on the received review and other reviews for the content publisher. The advertisement management system is configured to provide the aggregated approval score to an advertiser and to receive, from the advertiser, an indication to accept or reject the targeting of the advertisements to the publisher content. The indication is received after providing the aggregated approval score to the advertiser.

In another general aspect, a computer readable medium stores a computer program. The computer program includes instructions that, when executed, cause at least one processor to: receive a review for a content publisher, the content publisher publishing content to which advertisements are targeted over a distribution network; generate an aggregated approval score for the content publisher based on the received review and other reviews for the content publisher; provide the aggregated approval score to an advertiser; and receive, from the advertiser, an indication to accept or reject the targeting of the advertisements to the publisher content, the indication being received after providing the aggregated approval score to the advertiser.

The details of one or more implementations are set forth in the accompanying drawings and the description below. Other features and advantages will be apparent from the description and drawings as well as from the claims.

BRIEF DESCRIPTION OF THE DRAWINGS

The accompanying drawings show features of implementations consistent with this disclosure and, together with the corresponding description, help explain principles associated with the disclosure.

FIGS. 4-6 are illustrations of example user interface displays.

FIG. 11 is a block diagram of an example user access device configuration.

DESCRIPTION

The following description refers to the accompanying drawings, in which, in the absence of a contrary representation, the same numbers in different drawings represent similar elements.

In some implementations, publishers (e.g., Internet content publishers including online newspapers, television stations, radio stations, etc.) or their proxies can review advertisements intended for display/presentation with publisher content (e.g., websites, broadcasts, etc.). Publishers can also review advertisers (e.g., a particular product manufacturer) associated with advertisements. The publishers can, for example, indicate that a particular advertisement or advertiser is offensive, objectionable, racy, damaging to the publisher brand, suitable for general viewing, suitable for certain demographics, a competitor, a client, of low production value, etc. In some examples, the publishers can review advertisements/ advertisers using an interface, such as graphical user interface provided by a server application managing advertisements.

The publisher reviews of the advertisements and/or advertisers can be aggregated to generate an aggregated score for the advertisement or advertiser. This aggregated score may represent the percentage of publishers indicating that a particular ad is offensive, objectionable, racy, brand-damaging, etc. Publishers can then decide whether to approve or disapprove advertisements/advertisers based on, for example, the aggregated scores and particular publisher tolerances, capitalizing on the collective wisdom of publishers. Publishers can set rules that effect automated approval decisions for advertisements and advertisers based on the aggregated scores. The size and revenue associated with publishers can be used to weight reviews and/or affect selections.

By approving or disapproving advertisements or advertisers, publishers can maintain control over the advertisements that appear with their content. Publishers can gain transparency into the advertisements that have or could by presented with their content. Publishers can thereby protect their brand while maximizing their revenue.

Figure 1:
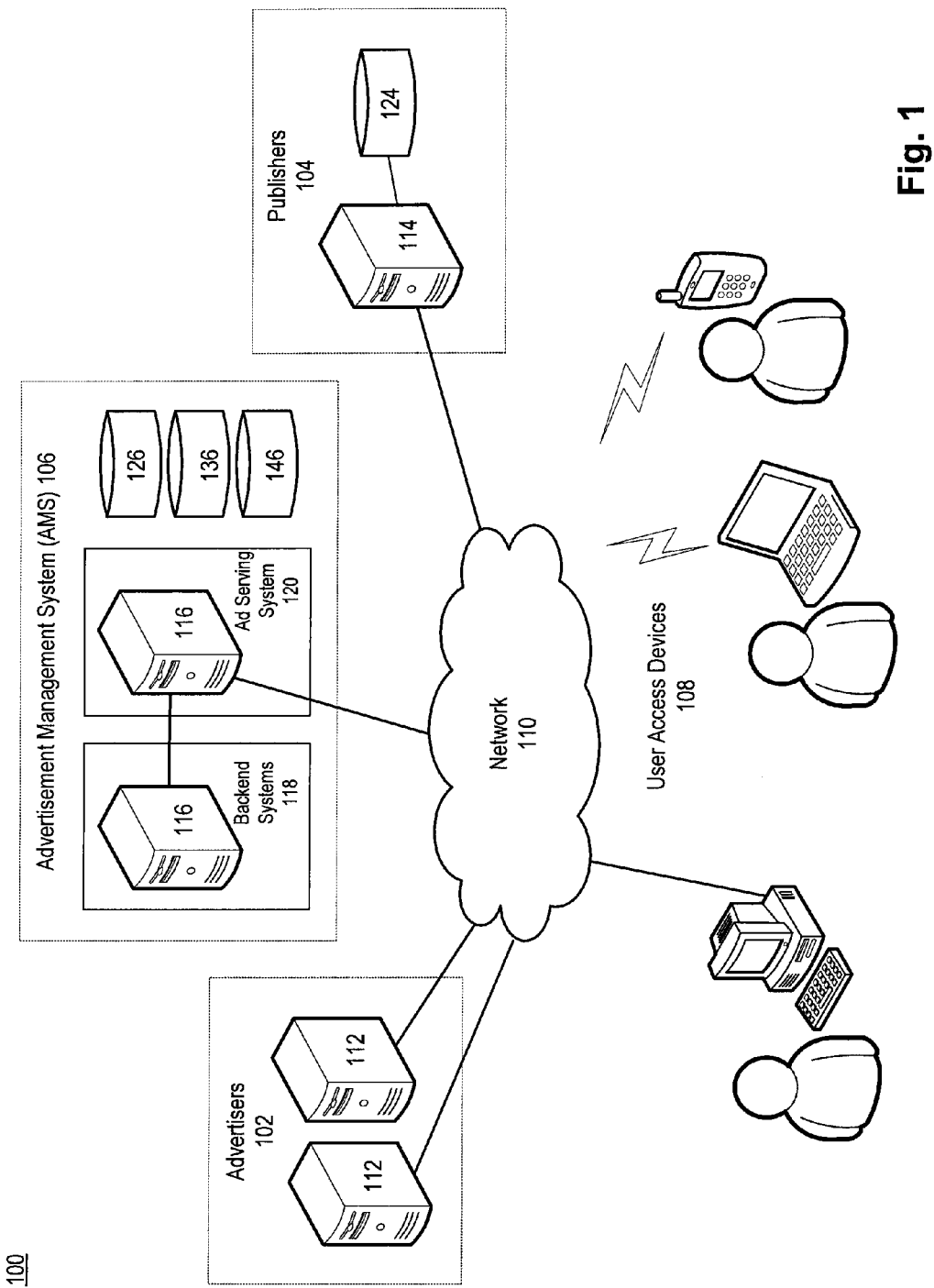
FIG. 1 is a block diagram depicting an example advertising environment.

With reference to FIG. 1, an example advertising environment 100 may include one or more advertisers 102, one or more publishers 104, an advertisement management system (AMS) 106, and one or more user access devices 108, which may be coupled to a network 110. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as an advertisement distribution network. While reference is made to distributing advertisements, the environment 100 can be suitable for distributing other forms of content including other forms of sponsored content.

The advertisers 102 may include any entities that are associated with advertisements ("ads"). An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to or include sponsored content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The term "ad" can refer to both a single "creative" and an "ad group." A creative refers to any entity that represents one ad impression. An ad impression refers to any form of presentation of an ad such that it is viewable/receivable to a user. In some examples, an ad impression may occur when an ad is displayed on a display device of a user access device. An ad group refers, for example, to an entity that represents a group of creatives that share a common characteristic, such as having the same ad targeting criteria. Ad groups can be used to create an ad campaign.

The advertisers 102 may provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, maintain and/or track ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems.

The publishers 104 may include any entities that generate, maintain, provide, present and/or otherwise process content in the environment 100. The term "content" refers to various types of web-based and/or otherwise presented information, such as articles, discussion threads, reports, analyses, financial statements, music, video, graphics, search results, web page listings, information feeds (e.g., RSS feeds), television broadcasts, radio broadcasts, printed publications, etc.

In some implementations, the publishers 104 may include content providers with an Internet presence, such as online publication and news providers (e.g., online newspapers, online magazines, television websites, etc.), online service providers (e.g., financial service providers, health service providers, etc.), and the like. The publishers 104 can include television broadcasters, radio broadcasters, satellite broadcasters, and other content providers. One or more of the publishers 104 may represent a content network that is associated with the AMS 106.

The publishers 104 may receive requests from the user access devices 108 (or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In addition to content, the publishers 104 may be configured to integrate or combine retrieved content with ads that are related or relevant to the retrieved content for display to users. As discussed further below, these relevant ads may be provided from the AMS 106 and be combined with content for display to users. In some examples, the publishers 104 may retrieve content for display on a particular user access device 108 and then forward the content to the user access device 108 along with code that causes one or more ads from the AMS 106 to be displayed to the user. In other examples, the publishers 104 may retrieve content, retrieve one or more relevant ads (e.g., from the AMS 106 or the advertisers 102), and then integrate the ads and the article to form a content page for display to the user.

As noted above, one or more of the publishers 104 may represent a content network. In such an implementation, the advertisers 102 may be able to present ads to users through this content network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to the advertisers 102, the publishers 104, and the user access devices 108. The AMS 106 may store ads in an ad repository 126 and facilitate the distribution or targeting of ads through the environment 100 to the user access devices 108. In some configurations, the AMS 106 may include or access functionality associated with the AdWords™ and AdSense™ systems provided by Google, Inc. (Mountain View, Calif.).

The AMS 106 may include one or more data processing systems 116, such as servers or embedded systems, coupled to the network 110. It can also include one or more processes, such as server processes. In some examples, the AMS 106 may include an ad serving system 120 and one or more backend processing systems 118. The ad serving system 120 may include one or more data processing systems 116 and may perform functionality associated with delivering ads to publishers or user access devices. The backend processing systems 118 may include one or more data processing systems 116 may perform functionality associated with identifying relevant ads to deliver, processing various rules, performing filtering processes, generating reports, maintaining accounts and usage information, and other backend system processing. The AMS 106 can use the backend processing systems 118 and the ad serving system 120 to target ads from the advertisers 102 through the publishers 104 to the user access devices 108.

The AMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publisher content, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The AMS 106 may include one or more interface or frontend modules for providing the various features to advertisers, publishers, and user access devices. For example, the AMS 106 may provide one or more publisher front-end interfaces (PFEs) for allowing publishers to interact with the AMS 106. The AMS 106 may also provide one or more advertiser front-end interfaces (AFEs) for allowing advertisers to interact with the AMS 106. In some examples, the front-end interfaces may be configured as web applications that provide users with network access to features available in the AMS 106.

The AMS 106 provides various advertising management features to the advertisers 102. In some examples, the AMS 106 may include features for advertisers similar to those in the AdWords™ system provided by Google, Inc. The AMS 106 advertising features may allow users to set up user accounts, set account preferences, create ads, select keywords for ads, create campaigns or initiatives for multiple products or businesses, view reports associated with accounts, analyze costs and return on investment, target customers in different regions, target ads to particular publishers, track financial information, track ad performance, estimate ad traffic, access keyword tools, add graphics and animations to ads, etc.

The AMS 106 may allow the advertisers 102 to create ads and input keywords for which those ads will appear. In some examples, the AMS 106 may provide ads to user access devices or publishers when keywords associated with those ads are included in a user request or requested content. The AMS 106 may also allow the advertisers 102 to set bids for ads. A bid may represent the maximum amount an advertiser is willing to pay for each ad impression, user click-through of an ad or other interaction with an ad. A click-through can include any action a user takes to select an ad. The advertisers 102 may also choose a currency and monthly budget.

The AMS 106 may also allow the advertisers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may also allow the advertisers 102 to select and/or create conversion types for ads. A "conversion" may occur when a user consummates a transaction related to a given ad. A conversion could be defined to occur when a user clicks on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The AMS 106 may store conversion data and other information in a conversion data repository 136.

The AMS 106 may allow the advertisers 102 to input description information associated with ads. This information could be used to assist the publishers 104 in determining ads to publish. The advertisers 102 may additionally input a cost/value associated with selected conversion types, such as a five dollar credit to the publishers 104 for each product or service purchased.

In some implementations, as further explained below in connection with FIG. 8, the AMS 106 may allow the advertisers 102 to approve or disapprove publishers. For example, the AMS 106 may allow the advertisers 102 to rate publisher content (e.g., websites, web pages, etc.). The AMS 106 may aggregate the publisher ratings and display to the advertisers 102 a set of scored publishers or scored publisher content. The AMS 106 may then allow the advertisers 102 to manually approve and disapprove members of the scored set and/or implement rules effecting automated approvals and disapprovals.

The AMS 106 may provide various features to the publishers 104. In some examples, the AMS 106 may include features for publishers similar to those in the AdSense™ system provided by Google, Inc. The AMS 106 may deliver ads (associated with the advertisers 102) to the user access devices 108 when users access content from the publishers 104. The AMS 106 can be configured to deliver ads that are relevant to publisher sites, site content and publisher audiences.

In some examples, the AMS 106 may crawl content provided by the publishers 104 and deliver ads that are relevant to publisher sites, site content and publisher audiences based on the crawled content. The AMS 106 may also target ads based on user information and behavior, such as particular search queries performed on a search engine website, a geographical location of the user, etc. The AMS 106 may store user-related information (e.g., personal profiles of users, geographic locations of users, ad context information) in a general data repository 146. In some examples, the AMS 106 can add search services (e.g., a Google™ search box) to a publisher site and deliver ads targeted to search results generated by requests from visitors of the publisher site. A combination of these and other approaches can be used to deliver relevant ads.

The AMS 106 may allow the publishers 104 to search and select specific products and services as well as associated ads to be displayed with content provided by the publishers 104. For example, the publishers 104 may search through ads in the ad repository 126 and select certain ads for display with their content.

As further explained below in connection with FIGS. 3-7, the AMS 106 may allow the publishers 104 to review ads intended for display with publisher content as well as advertisers associated with ads. The publishers 104 can provide reviews by, for example, indicating that a particular ad or advertiser is offensive, damaging to the publisher brand, suitable for general viewing, suitable for certain demographics, a competitor, a client, of low production value, etc.

The AMS 106 can receive publisher reviews of ads and advertisers and aggregate these reviews to generate an aggregated score for the ad or advertiser. This functionality may be performed by the backend processing systems 118. The AMS 106 may present aggregated scores to the publishers 104, allowing the publishers 104 to make approval decisions based on the aggregated scores. For example, the AMS 106 may indicate to the publishers 104 that a certain percentage (e.g., 40%) of publishers find a particular ad to have a low production value. The AMS 106 may then allow the publishers 104 to approve ads/advertisers based on the aggregated scores. An approval may indicate that the publisher is allowing ads to be served with publisher content. A disapproval may indicate that the publisher is blocking particular ads or advertisers. The AMS 106 can allow the publishers 104 to approve/disapprove ads and advertisements manually or using decision rules that effect automated approvals/disapprovals.

The AMS 106 may be configured to target ads created by the advertisers 102 to the user access devices 108 directly or through the publishers 104. The AMS 106 may target ads to a particular publisher 104 or a requesting user access device 108 when a user requests search results or loads content from the publisher 104.

In some configurations, the AMS 106 may target ads using a searching portion and a content portion. The searching portion may include one or more elements for providing various searching features to the user devices 108 and targeting ads to users based on search terms. The content portion may include one or more elements for targeting ads to users based on content rather than specific terms. The content portion may target ads based on content provided by the publishers 104.

The AMS 106 can target ads using static targeting and/or dynamic targeting. Static targeting may involve targeting ads based on some static publisher-specific placement criteria, such as by site or channel. In static targeting, the advertisers 102 can specify where ads will be served. Dynamic targeting may involve using one or more matching processes that match ads to context, geographic location, language, and other criteria.

The AMS 106 may be configured to identify relevant ads for targeting using various information, such as ad keywords, content keywords, geographic information, web page identifiers and/or content indices. As an example, the AMS 106 can receive a URL of a requested content page (e.g., from the user access device 108 or the publisher 104). The AMS 106 may match the URL to indexed content keywords associated with the URL to determine a user interest. The AMS 106 may then match the user interest with ads in the repository 126 relevant to the interest. The AMS 106 may, for example, use ad keywords from the advertisers 102 and/or other ad information to identify the ads. The AMS 106 could compare ad keywords from the advertisers 102 or other information to content keywords and/or content in the content page to identify relevant ads. In some examples, the ad selections and preferences specified by the publishers 104 can be used by the AMS 106 when it selects relevant ads.

In some implementations, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

The user access devices 108 may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes run on separate machines or a single process running on a single machine.

Figure 2:
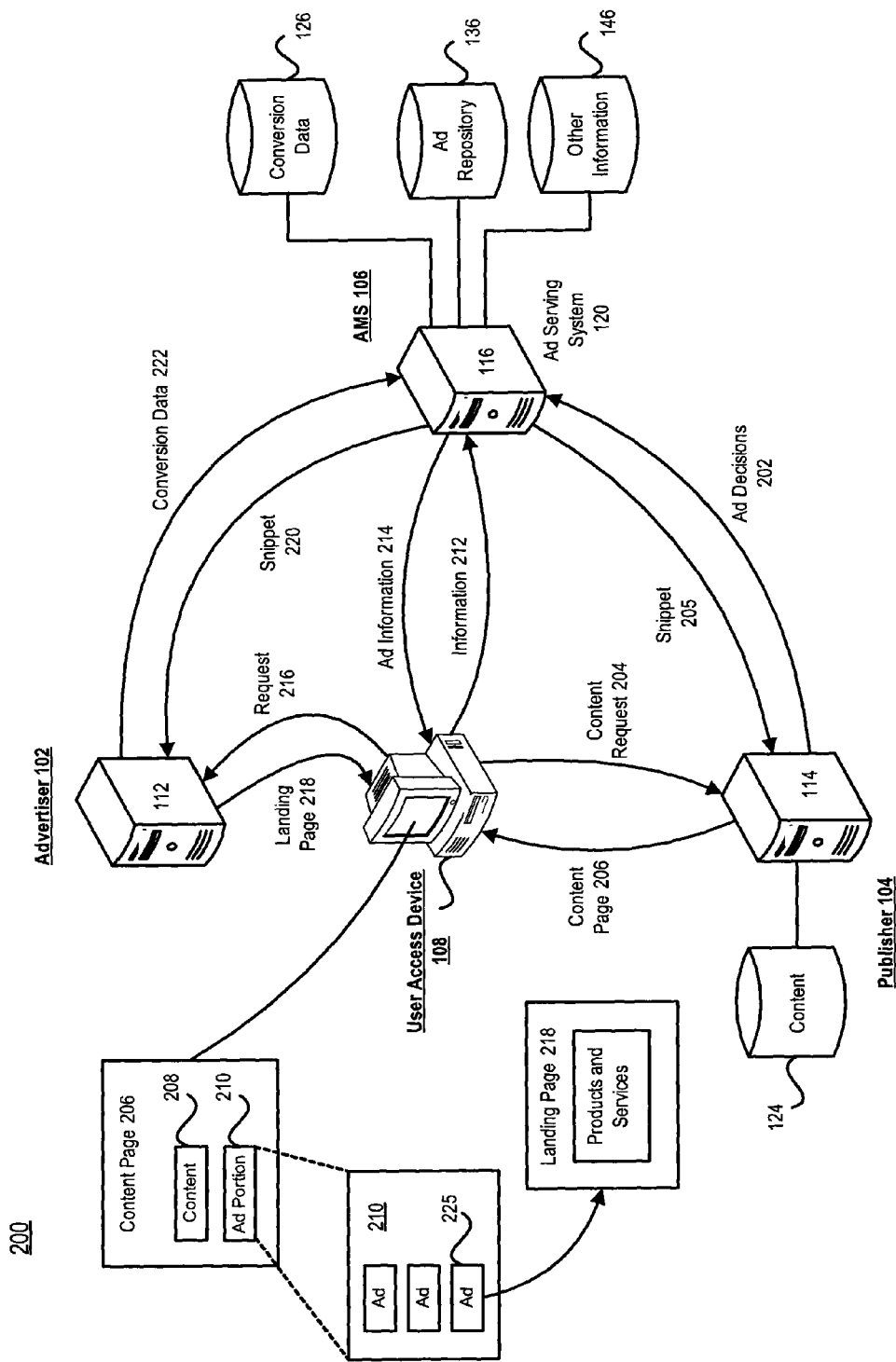
FIG. 2 is a diagram illustrating an example data flow within an advertising environment.

FIG. 2 illustrates an example data flow 200 within the environment 100. The data flow 200 is an example only and not intended to be restrictive. Other data flows may therefore occur in the environment 100 and, even with the data flow 200, the illustrated events and their particular order in time may vary.

In the data flow 200, the AMS 106 stores ads from the advertisers 102 and receives ad decisions 202 from a particular publisher 104. The ad decisions 202 can include decisions to approve and/or disapprove certain ads and/or advertisers. These ad decisions can be based on aggregated ratings or scores, associated with ads/advertisers that are provided to the publisher 104 by the AMS 106. Such aggregated scores can represent ratings of ads/advertisers received from multiple publishers 104.

During the data flow 200, the publisher 104 may receive a content request 204 from a particular user access device 108. The content request 204 may, for example, include a request for a web document on a given topic (e.g., automobiles). In response to the request 204, the publisher 104 may retrieve relevant content (e.g., an automobile article) from the content repository 124 or some other source.

The publisher 104 may respond to the content request 204 by sending a content page 206 or other presentation to the requesting user device 108. The content page 206 may include the requested content 208 (e.g., the automobile article) as well as a code "snippet" 205 associated with an ad. A code "snippet" refers, for example, to a method used by one device (e.g., a server) to ask another device (e.g., a browser running on a client device) to perform actions after or while downloading information. In some examples, a code "snippet" may be implemented in JavaScript® code or may be part of HTML (Hypertext Markup Language) or other web page markup language or content.

The AMS 106 may provide the code snippet 205 to the publisher 104 and/or the user access device 108. The code snippet can originate and/or be provided from other sources. As the requesting user device 108 loads the content page 206, the code snippet 205 causes the user device 108 to contact the AMS 106 and receive additional code (e.g., Java Script® or the like), which causes the content page 206 to load with an ad portion 210.

The ad portion 210 may include any element that allows information to be embedded within the content page 206. In some examples, the ad portion 210 may be implemented as an HTML element, such an I-Frame (inline frame) or other type of frame. The ad portion 210 may be hosted by the AMS 106 or the publisher 104 and may allow content (e.g., ads) from the AMS 106 or the publisher 104 to be embedded inside the content page 206. Parameters associated with the ad portion 210 (e.g., its size and shape) can be specified in the content page 206 (e.g., in HTML), so that the user access device 108 can present the content page 206 while the ad portion 210 is being loaded. Other implementations of ad portion 210 may also be used.

The ad portion 210 may send the AMS 106 formatting and content information 212. This information 212 may include information describing the manner (e.g., how, when, and/or where) in which ads can be rendered by the user access devices 108. The information 212 may also include ad attributes and parameters, such as size, shape, color, font, presentation style (e.g., audio, video, graphical, textual, etc.), etc. The information 212 may also specify a quantity of ads desired.

The formatting and content information 212 can include information associated with the content 209 displayed in content page 206. Such information may include a URL associated with the requested content page 206. The information 212 can include the requested content itself, a category corresponding to the requested content or the content request, part or all of the content request 204, content age, content type (e.g., text, graphics, video, audio, mixed media, etc.), geo-location information, and the like.

In response to the information 212, the AMS 106 may provide the user access device 108 with ad information 214. The ad information 214 may include one or more ads 225 for placement in the ad portion 210 of the content page 206. The ad information 214 may also include a signed or encoded specification of an ad.

The ad information 214 may include ads that are relevant to user interest. The AMS 106 may retrieve and provide relevant ads based on the information 212 received from the user access device 108. The AMS 106 may retrieve the ad information 216 from the ad repository 126 using the backend processing systems 118. The AMS 106 may retrieve relevant ads using information from a crawling module, various keywords, various statistical associations between ads and content, and/or preference information associated with the publishers.

The AMS 106 may decide whether to serve certain ads with publisher content based on the ad decision 202 received from the publisher 104. For example, the AMS 106 may identify a relevant ad from the ad repository 136 based on keywords but may decide that the ad should not be served with the publisher content (e.g., the requested automobile document) because the publisher 104 has indicated in the ad decisions 202 a disapproval of the identified ad. In some examples, these ad serving decisions may be based on rules maintained by the backend processing systems 118.

The ad portion 210 may populate with ads included in the ad information 214, such as ads 225. The ad portion 210 and the displayed ads 225 may occupy a portion of the content page 206, which may be distinct from other content (e.g., the content 208) in the content page 206.

When a user clicks on the displayed ad 225, an embedded code snippet may direct the user access device 108 to contact the AMS 106. During this event, the user access device 108 may receive an information parcel, such as a signed browser cookie, from the AMS 106. This information parcel can include information, such as an identifier of the selected ad 225, an identifier of the publisher 104, and the date/time the ad 225 was selected by the user. The information parcel may facilitate processing of conversion activities or other user transactions.

The user access device 108 may then be redirected to the advertiser 102 associated with the selected ad 225. The user access device 108 may send a request 216 to the associated advertiser 102 and then load a landing page 218 from the advertiser 102. The user may then perform a conversion action at the landing page 218, such as purchasing a product or service, registering, joining a mailing list, etc. A code snippet 220, which may be provided by the AMS 106, may be included within a conversion confirmation page script, such as a script within a web page presented after the purchase. The user access device 108 may execute the code snippet 220, which may then contact the AMS 106 and report conversion data 222 to the AMS 106. The conversion data 222 may include conversion types and numbers as well as information from cookies. The conversion data 222 may be maintained in the conversion data repository 136.

FIG. 2 is an example only and not intended to be restrictive. Other data flows may therefore occur in the environment 100 and, even with the data flow 200, the illustrated events and their particular order in time may vary. Further, the illustrated events may overlap and/or may exist in fewer steps. Moreover, certain events may not be present and additional and/or different events may be included.

In alternative data flows, the AMS 106 can allow advertisers to approve publishers in a manner similar to the manner in which publishers approve advertisers. In such data flows, the AMS 106 can receive publisher decisions from one or more advertisers 102. The publisher decisions can include approvals and disapprovals of certain publishers. These approval/disapproval decisions can be based on aggregated scores, associated with publishers that are provided to advertisers. The aggregated scores can represent ratings of publishers received from multiple advertisers 102. When providing relevant ads to the user access devices 108, the AMS 106 may take into account these publisher approvals/disapprovals. For example, the AMS 106 may decide to not provide an otherwise relevant ad to a given publisher based on the advertiser's disapproval of that publisher. Not providing can include not bidding in an auction for publisher ad space.

In alternative data flows, the publisher 104 can send an ad request to the AMS 106 prior to sending a content page to the user access device 108. The AMS 106 may respond by sending relevant ads to the publisher 104. The publisher 104 may combine the received ads with requested content in the content page and then send the content page, including the ad portion, to the user access device 108 for display to a user.

In alternative data flows, the AMS 106 may target ads to the user access devices 108 based on search terms provided by the user access devices 108. In these dataflows, the AMS 106 may provide searching services and receive search terms directly from the user access devices. The AMS 106 can also receive search terms from a dedicated searching system that receives user search requests. The AMS 106 may target ads to the user access devices based on the received search terms and ad keywords provided by the advertisers. Other modifications to the data flow 200 are also possible.

Figure 3:
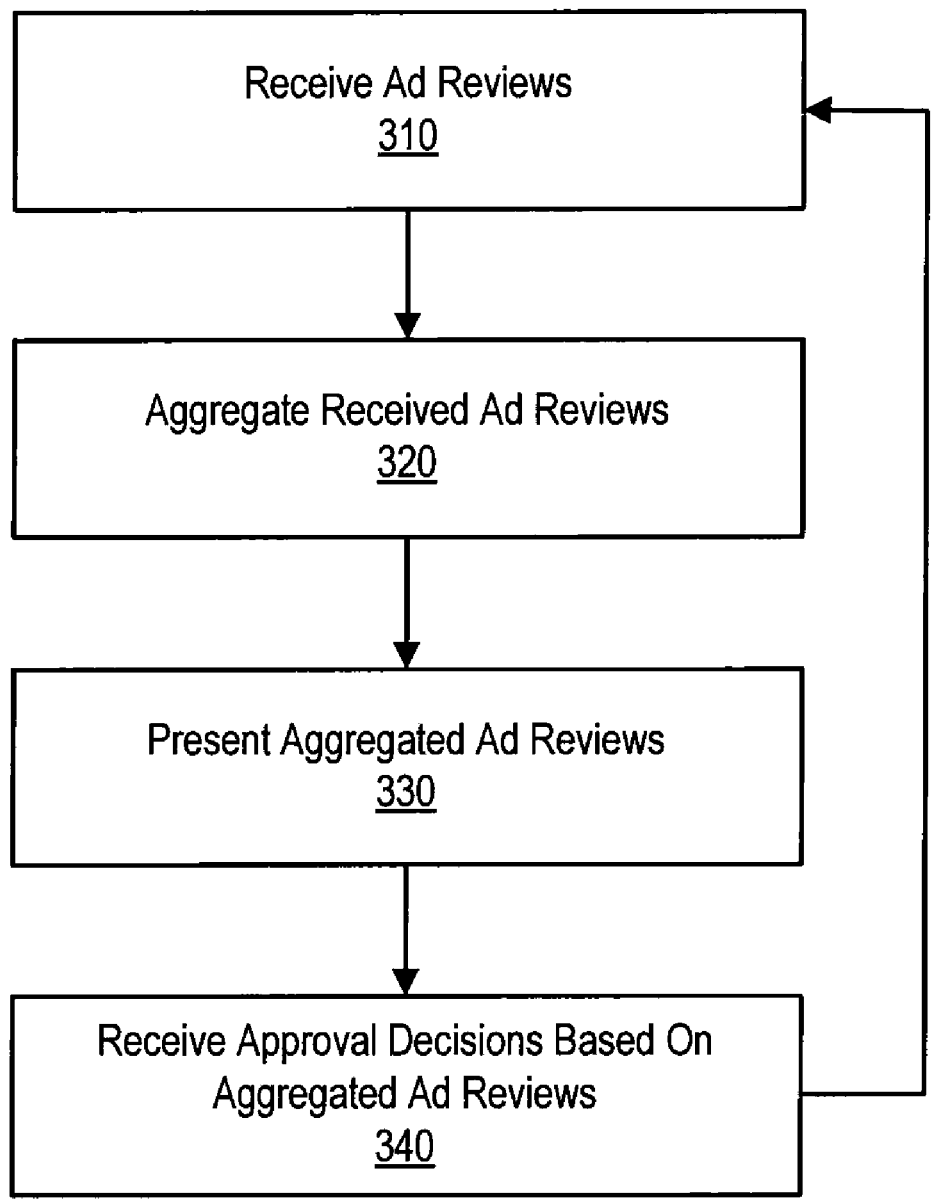
FIG. 3 is a flow diagram depicting an example advertisement review process.

FIG. 3 is a flow diagram illustrating an example ad review process 300. In some implementations, the process 300 may be performed by one or more elements in the AMS 106. The process 300 can be performed by other systems in conjunction with or instead of the AMS 106. The process 300 may receive ad reviews (310), aggregate received ad reviews (320), present aggregated ad reviews (330) and receive approval decisions based on aggregated ad reviews (340).

The process 300 may receive ad reviews (310). This can involve receiving one or more ad reviews from one or more of the publishers 104. Receiving an "ad review" can include, for example, receiving any type of view or judgment regarding an ad or an advertiser. Ad reviews can include, for example, indications that a particular ad or advertiser is offensive, objectionable, racy, damaging to the publisher brand, suitable for general viewing, suitable for certain viewers or demographics, a competitor or related to a competitor, a client or related to a client, producing low value, not relevant to a publisher audience (e.g., ad content not relevant or advertiser not relevant), etc. Ad reviews can also include, for example, indications that the look and feel of ads or advertisers are not consistent with the publisher site. Various other indications are possible.

Receiving ad reviews may involve receiving approvals and disapprovals associated with ads and advertisers. An approval may indicate that the publisher is allowing ads to be served with publisher content. A disapproval may indicate that the publisher is blocking particular ads or advertisers. Receiving ad reviews may involve receiving particular bases for such approvals and disapprovals (e.g., offensive, brand-damaging, low production value, etc.). Receiving ad reviews can also involve receiving indications that publishers would like to "hold" an ad/advertiser for subsequent review.

As discussed above, ads can include both individual creatives and ad groups. Receiving ad reviews (310) can involve receiving reviews at the individual creative level and/or at the ad group level. For example, the receiving can involve receiving a disapproval for a specific ad or a disapproval for an entire ad group.

In some implementations, receiving ad reviews (310) may involve selecting and presenting to the publishers 104 ad review sets. An ad review set can include a set of ads that are reviewable by a specific publisher 104. The selection of ad review sets can be performed by one or more components in the AMS 106. Users may also generate ad review sets, independently or in conjunction with the AMS 106.

The ad review set can be selected using a variety of selection criteria. In some examples, an ad review set for a given publisher can include all unexpired ads stored in the AMS 106 regardless of relevancy to the content provided by the publisher. An ad review set can alternatively include a set of sample ads that have been or can be displayed with the publisher's content. This sample set can be identified using the backend processing systems 118 in the AMS 106. As another example, an ad review set can include all unexpired ads maintained by the AMS 106 that have potential for being served to the publisher in the near future (e.g., 30 days). An ad review set can also include all unexpired ads maintained by the AMS 106 that can be previewed by the publisher.

As another example, the ad review set can include all unexpired ads maintained by the AMS 106 that have been served to the publisher in a certain time window in the past (e.g., the previous day, the last two days, the last thirty days, etc.). The particular time window may be selected or specified by the particular publisher. This ad review set may include ads selected regardless of the particular targeting model used for the ads. For example, assuming a thirty-day window, all ads served in that thirty-day window can be selected for the set regardless of the targeting basis on which those ads were served. The ad review set could alternatively include all ads that have been statically targeted to some portion of the publisher content or site, including ads that have not yet been served.

Each of multiple publishers can be presented with a different ad review set, and different ad review set selection criteria can be used for each publisher. In some examples, the AMS 106 can specify the selection criteria independently or in conjunction with input from the publisher 106. The selection criteria can change over time.

Receiving ad reviews (310) may involve presenting an interface through which the publishers 104 can view ad review sets and input ad reviews. Presenting an "interface" may involve generating and presenting any type of physical or virtual mechanism by which a user (or system) can input information (e.g., the ad reviews) to the AMS 106 or other system and/or by which a user (or system) can perceive information generated by such systems. In some examples, presenting an interface can involve generating and presenting a graphical user interface (GUI), for example, using one or more of the front-end interfaces (e.g., the PFEs) in the AMS 106. Other types of interfaces could also be used.

Presenting an interface may involve presenting in the interface various control elements for inputting ad reviews. A control element may include any physical or virtual element or widget that allows a user (or system) to select or indicate an ad review. Presenting control elements may include generating and presenting various selection buttons, check boxes, radio buttons, toggle buttons, list boxes, pull- or drop-down lists/menus, spinners, combo boxes, check lists, select boxes, dialogue boxes, pop-ups, windows, etc. In some examples, control elements could include text fields in which users can input descriptions (e.g., descriptions of ad reviews) for analysis and processing by the AMS 106.

Figure 4:
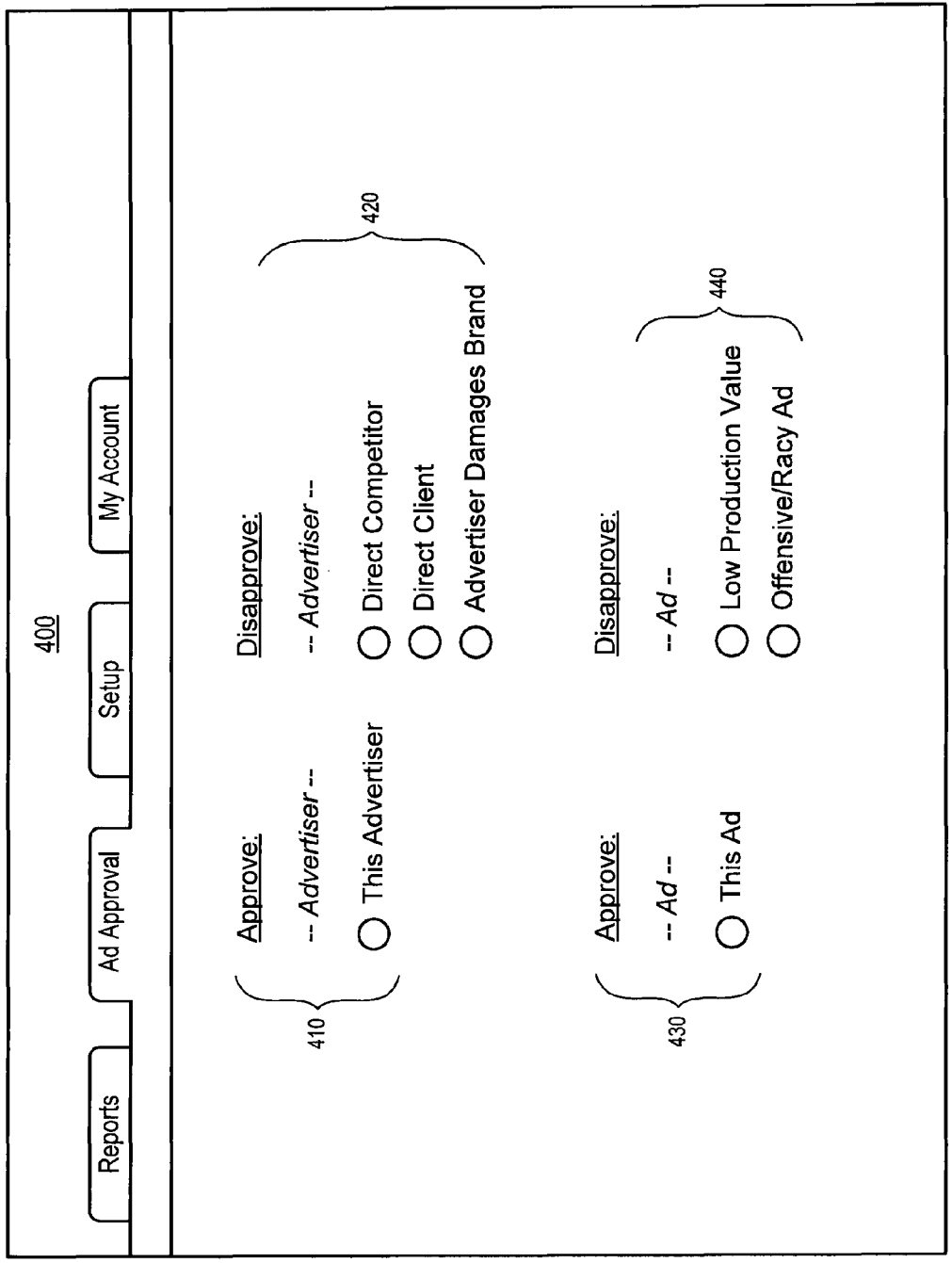

FIG. 4 shows an example display 400 that can be generated by an interface for viewing ad review sets and inputting ad reviews. As illustrated in FIG. 4, the interface display 400 may include various selectable control elements for effecting ad reviews. The display 400 may present a control element 410 for allowing a user to approve a particular advertiser 102. The display 400 may also present a control element 420 for allowing a user to disapprove the advertiser. Each option of the control element 420 may indicate a different basis for disapproving the advertiser. For example, one of the options in the element 420 may allow the publisher to indicate disapproval on the basis that the advertiser is a direct competitor. Selecting another option in the element 420 may indicate disapproval on the basis that the advertiser is direct client. As another example, the selection of a particular option in the element 420 may indicate that the publisher 104 is disapproving of the advertiser because the advertiser damages the publisher brand.

In addition to advertiser options, the display 400 may present selectable control elements related to approving and disapproving ads. For example, the display may include a control element 430 for allowing a user to approve a particular ad. The display 400 may also present a control element 440 for allowing a user to disapprove of the ad. As with the element 420, the element 440 may include different options indicating different bases for disapproval. For example, one option of the element 440 may allow the publisher to indicate disapproval on the basis that the ad is producing low value. Selecting another option in the element 440 may indicate disapproval on the basis that the ad is offensive.

In some implementations, when a publisher selects (e.g., clicks) any of the advertiser-level options in the element 410 and 420, that decision can be applied, for example, to all currently unchecked and future ads from that advertiser. When a publisher selects any of the ad-level options in the elements 430 and 440, that decision can be processed, for example, as an approval or disapproval of the particular ad.

Referring back to FIG. 3, the process 300 may aggregate received ad reviews (320). This may involve using the backend processing systems 118 in the AMS 106 to aggregate or compile ad reviews. Aggregating received ad reviews may involve aggregating or compiling ad reviews using different types of disapprovals. For example, "Direct Competitor" disapprovals, "Direct Client" disapprovals, and "Damages Brand" disapprovals can be aggregated, either separately or in a combined fashion. In some examples, the aggregating may involve aggregating only those ad reviews manually entered by publishers.

Aggregating ad reviews (320) may involve determining percentages or other quantitative indicators or scores associated with ad reviews. In some examples, the aggregating may involve determining a percentage of publishers (relative to the number of publishers participating in the process) that have indicated a particular basis for disapproving an ad/advertiser. As an example, the aggregating may involve determining a percentage of publishers that have indicated that a particular ad/advertiser is offensive/racy or brand-damaging.

Ads can include both individual creatives and ad groups. In some implementations, aggregating ad reviews (320) can involve determining percentages or other quantitative indicators at the individual creative level and/or at the ad group level. For example, the aggregating can involve determining a percentage for a specific ad or for an entire ad group.

In some examples, aggregating ad reviews (320) may involve weighting received ad reviews. The weighting can be based on various criteria, such as publisher revenue, publisher size, publisher location, publisher tier, publisher traffic, etc. In some implementations, in the aggregating, ad reviews received from larger publishers can be weighted more heavily than ad reviews from smaller publishers. This may reflect an assumption that bigger publishers may have more sophisticated judgment about ad production value, brand impact and the like.

As an example, consider a set of two publishers: Pub1 with revenue of $90 k per year and Pub2 with revenue of $10 k per year. Pub1 may approve a particular ad, while Pub2 may indicate that the ad is offensive/racy. In this example, given the discrepancy in revenue, the aggregation of the ad reviews can be weighted such that the ad is given a 10% offensive/racy score. In this fashion, the aggregation score takes into account the differences in publisher revenue and the assumed difference in sophistication.

In some examples, determining a percentage for a given advertiser may include calculating the weighted sum of manual disapprovals for the advertiser divided by the weighted sum of all manual disapprovals and approvals. The weights can be based on, for example, publisher revenue, publisher size, publisher location, publisher tier, publisher traffic, etc. Decisions on individual ads may not affect the advertiser-level percentage. Similarly, the ad-level percentage calculation may exclude advertisers-level approvals and disapprovals. Rule-based approvals may not be included in the percentage calculations, since they can unnecessarily amplify the initial signal.

Once aggregated information about disapproval rates exists for an advertiser or ad, the process 300 may present the aggregated ad reviews (330). Aggregated ad reviews can be presented at the individual creative level and/or at the ad group level. Presenting aggregated ad reviews (330) may involve presenting an interface through which the publishers 104 can view the aggregated information. This may involve, for example, generating and presenting a GUI, for example, using one or more PFEs in the AMS 106. Other types of interfaces could also be used. Presenting an interface may involve presenting in the interface various control and display elements for displaying aggregated ad reviews.

As discussed above, aggregating ad reviews may involve weighting received ad reviews. In a similar fashion, presenting aggregated ad reviews (330) may involve weighting. In some examples, the presenting may involve deciding whether or not to display or otherwise publish an ad/advertiser percentage or other indicator based on a revenue threshold. As an example, an ad/advertiser percentage may be published once it has been manually decided on by some threshold dollar amount or publisher revenue, such as $100 k or more.

FIG. 5 shows an example display 500 that can be generated by an interface for viewing aggregated ad reviews. As illustrated in FIG. 5, the interface display 500 may include one or more aggregation indicators 510. The aggregation indicators 510 can include any type of control or display element for presenting aggregated ad reviews. In FIG. 5, the aggregation indicators 510 include percentage indicators 512, 514 and 516. The percentage indicators represent the percentage of publishers (relative to the number of publishers in the system) associated with a certain ad review. The percentage 512 may represent, for example, the percentage of publishers that have indicated that an ad is associated with a brand-damaging advertiser. The percentage 514 may represent, for example, the percentage of publishers indicating that an ad is offensive. The percentage 516 may represent, for example, the percentage of publishers indicating that an ad has a low production value. Various other percentages can also be used.

In some examples, presenting aggregated ad reviews (330) may involve displaying the aggregated ad reviews in conjunction with previous approval and disapproval decisions. For example, as illustrated in FIG. 5, the percentages 512, 514 and 516 can be displayed in an interface that displays one or more ads 520 previously approved by the publishers (e.g., approved during stage 310). The percentages can also be displayed along with disapproved ads, approved advertisers and/or disapproved advertisers.

As illustrated in FIG. 5, the aggregated ad reviews can also be displayed along with approval types 530 and approval dates 540. The approval types 530 can indicate the manners in which ads were approved/disapproved. For example, approval types can indicate that an ad was approved/disapproved manually (e.g., "Manually Approved"), approved/disapproved using automated rules (e.g., "Rule-based Approved Ad"), or approved/disapproved by a default approval setting (e.g., "Ad Approved by Default"). The approval dates 540 can indicate when ads were approved.

While FIG. 5 shows the aggregation indicators 510 (e.g., percentages) for a single ad, this is merely an example. Presenting the aggregated ad reviews (330) may involve presenting percentages or other aggregation indicators at the individual creative level and/or at the ad group level.

In some examples, presenting the aggregated ad reviews (330) may involve allowing publishers to search or sort aggregated ad reviews. It may also involve allowing publishers to search or sort ads and advertisers (e.g., previously approved/disapproved ads/advertisers). The process 300 may allow publishers to search or sort based on time windows, revenue opportunity, text in ads, words in image ads, advertiser names, etc. In some examples, providing searching and sorting may involve functionality associated with the AdSearch system provided by Google, Inc.

FIG. 5 is merely an example, and aggregated information can be presented in various other interfaces. In alternative examples, the percentages 510, 520 and 530 can be displayed in an interface dedicated to aggregated information. The percentages can also be displayed along with information different that what is illustrated in FIG. 5. For example, the percentages can be part of generated statistic reports, account preferences, and other displayed information.

After presenting aggregated ad reviews, the process 300 may receive approval decisions based on aggregated ad reviews (340). An approval decision may indicate that the publisher is allowing ads to be served with publisher content. A disapproval decision may indicate that the publisher is blocking particular ads or advertisers. A publisher may, for example, view the percentages 512, 514 and 516 and then input a decision to allow or block ads/advertisers. Receiving approval decisions (340) can include receiving approval decisions at the individual creative level and/or at the ad group level.

Receiving approval decisions can involve presenting an interface through which the publishers 104 can input the decisions. This may involve generating and presenting a GUI using one or more PFEs in the AMS 106. Other types of interfaces could also be used. Presenting an interface may involve presenting in the interface various control and display elements for allowing publisher to input information.

In some examples, receiving approval decisions based on aggregated ad reviews (340) can involve allowing publishers to manually input approval decisions. In addition, or as an alternative, receiving approval decisions can involve allowing publishers to implement decision rules that effect automated rule-based approvals/disapprovals. These rules may effect automatic approval decisions based on thresholds and tolerances associated with publishers. For example, a given publisher can set a rule that causes all ads having a certain brand-damaging percentage (e.g., 10%) to be automatically disapproved. The backend systems 118 of the AMS 106 may be used to implement automated decision rules and carry out automated decisions based on the decision rules.

Figure 6:
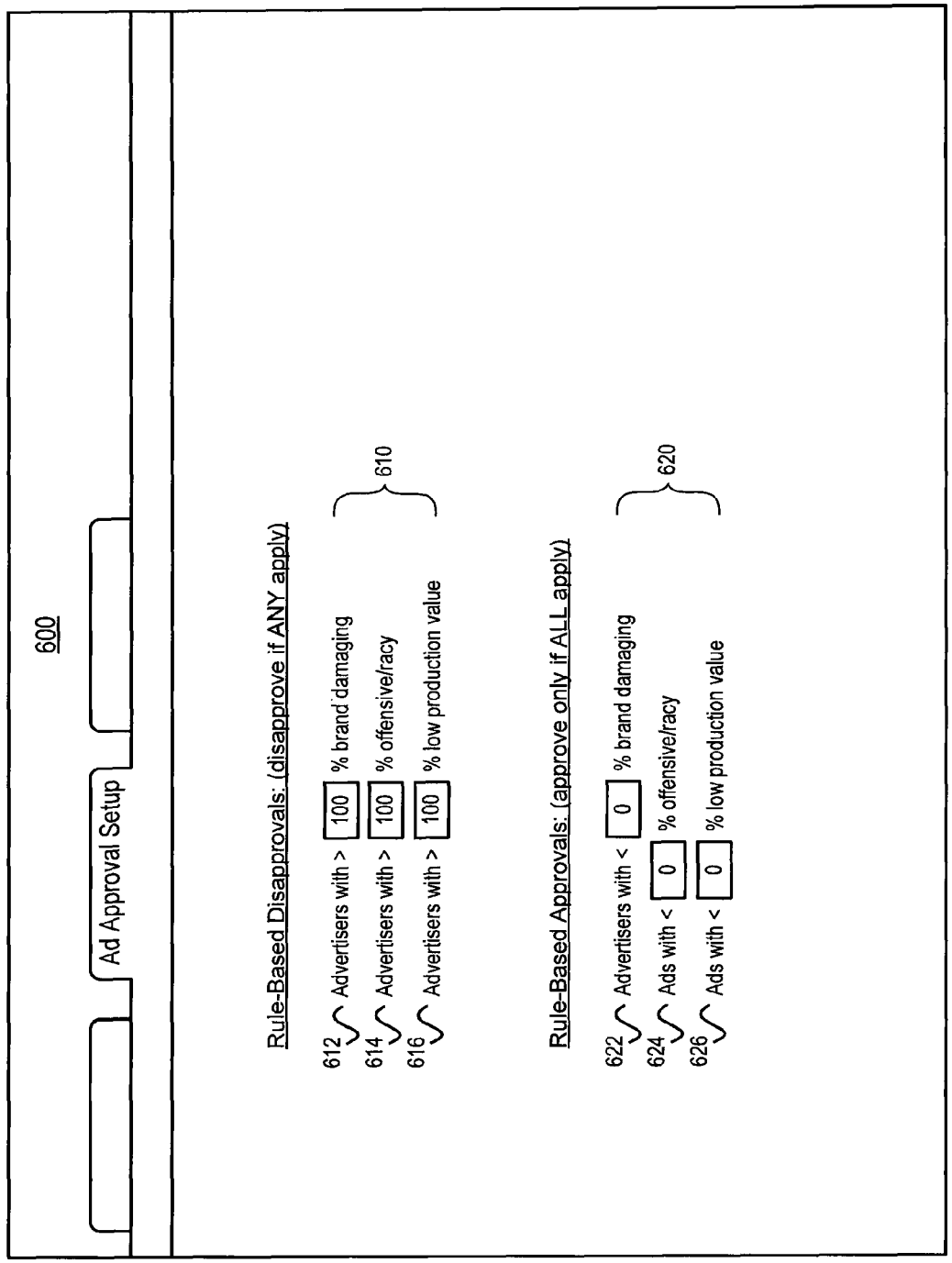

Implementing automated decision rules can involve presenting an interface through which the publishers 104 can input the rules and rule parameters. FIG. 6 shows an example display 600 that can be generated by an interface (e.g., associated with one or more PFEs) for allowing publishers to specify decision rules.

In FIG. 6, the display 600 includes a decision rule 610 for rule-based disapprovals and a decision rule 620 for rule-based approvals. The rule 610 may effect automated rule-based disapprovals based on one or more rule elements, such as elements 612, 614 and 616. Rule element 612 may relate to a percentage of publishers indicating that advertisers are "brand-damaging." The element 614 may relate to an "offensive/racy" percentage. The element 616 may relate, for example, to a "low production value" percentage. As illustrated, the publishers can input various tolerances associated with the rule elements 612, 614 and 616. These tolerances may include percentage numbers that, if exceeded, will trigger an automated disapproval. The decision rule 610 may cause a disapproval if any or all of the rule elements 612, 614 and 616 is satisfied.

Using rule 610, a publisher can effect an automated disapproval if any advertisers have a "brand-damaging" percentage, an "offensive/racy" percentage or a "low production value" exceeding the publisher tolerance. FIG. 6 depicts the tolerances as being 100% for each of the elements 612, 614 and 616. These may represent default tolerances initialized by the system. These default tolerances may never trigger and may allow publishers to wait or free-ride until other publishers review ads/advertisers.

The decision rule 620 for rule-based approvals may effect automated rule-based approvals based on one or more rule elements, such as elements 622, 624 and 626. Rule element 622 may relate to a percentage of publishers indicating that advertisers are "brand-damaging." The element 624 may relate to an "offensive/racy" percentage. The element 626 may relate, for example, to a "low production value" percentage. The publishers can input various tolerances associated with the rule elements 622, 624, 626. If exceeded, these tolerances can trigger an automated approval. The decision rule 620 may cause an approval if any or all of the rule elements 622, 624 and 626 is satisfied.

Using rule 620, a publisher can effect an automated approval of any advertisers having a "brand-damaging" percentage, an "offensive/racy" percentage or a "low production value" below the publisher tolerance. FIG. 6 depicts the tolerances as being 0% for each of the elements 622, 624 and 626. These may represent default tolerances initialized by the system. These 0% tolerances may never trigger and may allow publishers to wait for other publishers to provide reviews. If there are conflicting approvals and disapprovals, the process 300 may be biased to apply disapprovals before approvals.

In some implementations, the process 300 can provide to the publishers 104 insight into the distribution of ads across the various rule categories (e.g., offensive/racy, brand-damaging, low production value, etc.). This may allow the publishers 104 to gain an understanding of what percentage of total ads or advertisers are eliminated for a given rule threshold. The process 300 may present this distribution of ads across the rule categories during the presentation of rules (e.g., interface display 600) or at some other time.

In some implementations, the process 300 can display in an interface (e.g., the interface displays 400, 500 and/or 600) how much revenue a particular ad is expected to earn a publisher. This can allow the publishers 104 to make informed economic decisions about whether to approve or disapprove an ad. This expected revenue can be displayed to publishers when the publishers are manually entering ad reviews and approval decisions and/or when publishers are specifying approval rules for effecting automated approval decisions.

In some examples, the process 300 (e.g., using the backend systems 118) can calculate and provide to the publishers 104 an expected revenue loss resulting from a particular ad/advertiser disapproval. Additionally or alternatively, the process 300 (e.g., using the backend systems 118) can calculate and provide to the publishers 104 various cost indicators, such as an ECPM (effective cost per thousand impressions) indicator. The ECPM can be calculated, for example, by dividing the total earnings for an ad by the total number of ad impressions in thousands. As an example, a given ad could receive 700 impressions and $3.50 in total earnings. Calculating the ECPM for this ad reveals that the estimated earnings for every 1000 impressions is $5.00 ((3.50/700)*1000). The publishers 104 can use this ECPM figure to deduce or estimate the potential impact of disapproving an ad.

In addition, or as an alternative, to expected revenue information, the process 300 can calculate and provide historical revenue information, historical EPCM information, and/or other measures.

Figure 7:
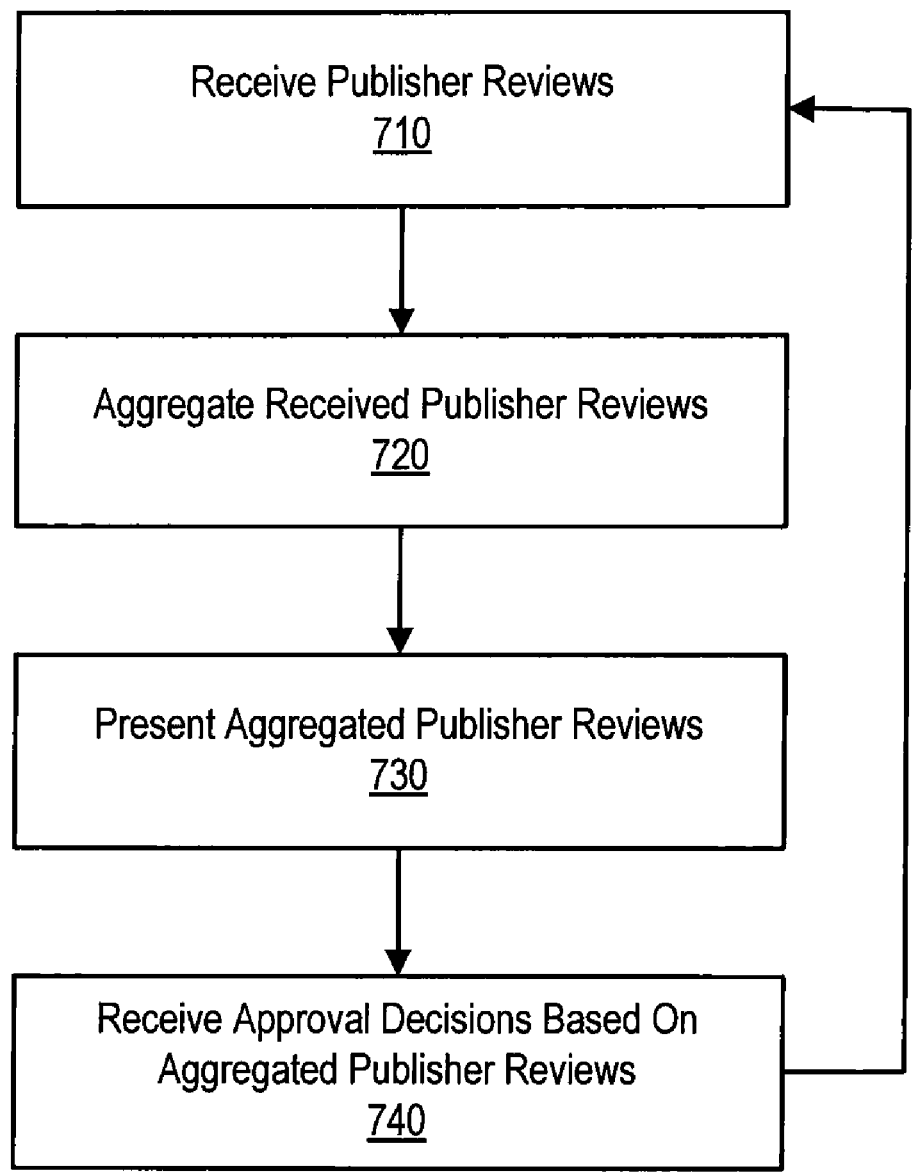
FIG. 7 is a flow diagram depicting an example publisher review process.

The process 300 in FIG. 3 relates to the reviewing of ads and the advertisers 102 by the publishers 104. In some implementations, the advertisers 102 can submit reviews of the publishers 104 and decide to approve or disapprove the publishers. FIG. 7 is a flow diagram illustrating an example publisher review process 700.

The process 700 may be performed by one or more elements in the AMS 106. The process 700 can be performed by other systems in conjunction with or instead of the AMS 106. The process 700 may receive publisher reviews (710), aggregate received publisher reviews (720), present aggregated publisher reviews (730) and receive approval decisions based on aggregated publisher reviews (740).

The process 700 may receive publisher reviews (710). This can involve receiving one or more publisher reviews from one or more of the advertisers 102. Receiving a "publisher review" can include, for example, receiving any type of view or judgment regarding a publisher. Publisher reviews can include, for example, indications that a particular publisher site is particularly effective for ad targeting or receiving a certain amount of traffic. Publisher reviews can also include ratings of publisher content (e.g., websites, web pages, etc.). For example, publisher reviews can include indications that publisher content is offensive. Various other indications are possible.

Receiving publisher reviews may involve receiving approvals and disapprovals associated with publishers. Receiving publisher reviews may also involve receiving particular bases for such approvals and disapprovals (e.g., offensive content). Receiving publisher reviews can also involve receiving an indication that the advertiser would like to "hold" a publisher for subsequent review.

In some implementations, receiving publisher reviews (710) may involve selecting and presenting to the advertisers 104 publisher review sets. A publisher review set can include a set of publishers that are reviewable by a specific advertiser 102. The selection of publisher review sets can be performed by one or more components in the AMS 106. Users may also generate publisher review sets, independently or in conjunction with the AMS 106.

The publisher review set can be selected using a variety of selection criteria. Each of multiple advertisers can be presented with a different publisher review set, and different publisher review set selection criteria can be used for each advertiser. In some examples, the AMS 106 can specify the selection criteria independently or in conjunction with input from the advertiser 102. The publisher review set selection criteria can change over time.

Receiving publisher reviews (710) may involve presenting an interface through which the advertisers 102 can view publisher review sets and input publisher reviews. In some examples, presenting an interface can involve generating and presenting a GUI, for example, using one or more of the advertiser front-end interfaces (AFEs) in the AMS 106. Other types of interfaces could also be used.

The process 700 may aggregate received publisher reviews (720). This may involve using the backend processing systems 118 in the AMS 106 to aggregate or compile publisher reviews. Aggregating received publisher reviews may involve aggregating or compiling publisher reviews using different types of approvals/disapprovals. As with ad reviews, in some implementations, aggregating publisher reviews may involve aggregating only those publisher reviews manually entered by advertisers. Rule-based approvals may not be included in the calculations in some examples, since they can unnecessarily amplify the initial signal.

As with ad reviews, aggregating publisher reviews (720) may involve determining percentages or other quantitative indicators or scores associated with publisher reviews. The aggregating may involve, for example, determining a percentage of advertisers (relative to the number of advertisers participating in the process) that have indicated a particular basis for approving/disapproving a publisher. As an example, the aggregating may involve determining a percentage of advertisers that have indicated that particular publisher content (e.g., a website) is offensive or brand-damaging.

As with ad reviews, aggregating publisher reviews (720) may involve weighting received publisher reviews. The weighting can be based on various criteria, such as advertiser revenue, advertiser size, advertiser location, advertiser tier, advertiser traffic, etc. As an example, in the aggregating, publisher reviews received from larger advertisers can be weighted more heavily than publisher reviews from smaller advertisers.

Once aggregated information about disapproval rates exists for a publisher, the process 700 may present the aggregated information (730). Presenting aggregated publisher reviews (730) can involve presenting an interface through which the advertisers 102 can view the aggregated information. This may involve generating and presenting a graphical user interface (GUI), for example, using one or more of the AFEs in the AMS 106.

Presenting aggregated publisher reviews (730) may involve weighting. The presenting may involve, for example, deciding whether or not to display or otherwise publish a publisher percentage or other indicator based on a threshold (e.g., a revenue threshold).

In some examples, presenting aggregated publisher reviews (730) may involve allowing advertisers to search or sort aggregated publisher reviews. It may also involve allowing advertisers to search or sort publishers (e.g., previously approved/disapproved publishers). The process 300 may allow publishers to search or sort based on various criteria, such as time, location, etc.

After presenting aggregated publisher reviews, the process 700 may receive approval decisions based on aggregated publisher reviews (740). This may involve receiving indications from the advertisers that ads should be served to approved publishers and should not be served (e.g., blocked) to disapproved publishers. Receiving approval decisions can involve presenting an interface through which the advertisers 102 can input the decisions.

Receiving approval decisions based on aggregated publisher reviews (740) can involve allowing advertisers to input manual approvals/disapproval. Additionally or alternatively, receiving approval decisions based on publisher reviews can involve allowing advertisers to implement decision rules that effect rule-based approvals/disapprovals of publishers. These rules may effect automatic approval decisions based on thresholds and tolerances associated with advertisers. For example, a given advertiser can set a rule that causes all publishers having a certain "offensive content" percentage (e.g., 10%) to be automatically disapproved. The backend systems 118 of the AMS 106 may be used to implement automated decision rules and carry out automated decisions based on the rules. Implementing automated decision rules can involve presenting an interface through which the advertisers 102 can input rules and rule parameters.

In some implementations, the process 700 can provide to the advertisers 102 insight into the distribution of publishers across the various rule categories. The process 700 can also calculate and present to the advertisers 102 expected revenue earnings and loss figures associated with publishers being reviewed. For example, the process can present how much revenue a particular publisher is expected to earn an advertiser. This can allow the advertisers 102 to make informed economic decisions about whether to approve or disapprove publishers.

Figure 8:
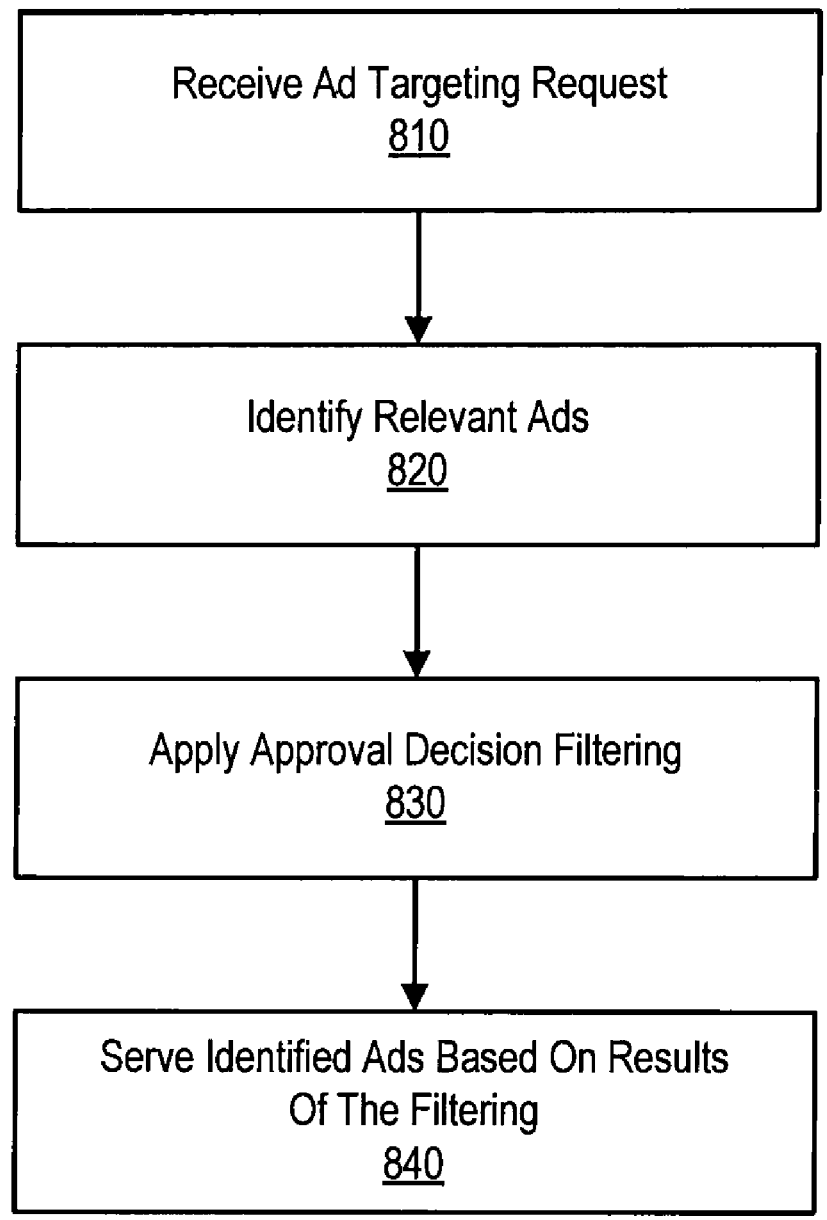
FIG. 8 is a flow diagram depicting an example advertisement serving process.

Turning now to FIG. 8, a flow diagram depicting an example advertisement serving process 800 will be discussed. The process 800 may be performed by one or more elements in the AMS 106, such as the ad serving system 120. The process 800 can be performed by other systems in conjunction with or instead of the AMS 106. The process 800 may receive an ad targeting request (810), identify relevant ads (820), apply approval decision filtering (830) and serve identified ads based on the filtering (840).

The ad serving process 800 may serve ads to publishers and user access devices based on approval decisions for ads and advertisers. The process 800 may additionally or alternatively serve ads based on approval decisions for publishers. That is, approvals and disapprovals of advertisers/ads made by publishers, as well as approvals and disapprovals of publishers made by advertisers, may provide bases for serving ads in the process 800.

The process 800 may begin by receiving an ad targeting request (810). This can involve, for example, the ad serving system 120 in the AMS 106 receiving information from a system or user causing the AMS 106 to target ads to that or another system/user. In some examples, the ad targeting request may include information associated with a request for publisher content. The ad targeting request may cause the AMS 106 to target ads to the requested publisher content, for example, by targeting ads to a publisher 104 or a user access device 108. As an example, receiving an ad targeting request can involve a publisher 104 receiving a content request (e.g., a search request, a request to access a webpage, etc.) from a user access device 108 and the publisher 104 providing information associated with the content request (e.g., search terms, a requested URL, the content request itself, user location, formatting information, ad parameters, etc.) to the ad serving system 120 in the AMS 106. In some examples, the ad targeting request may include information similar to the formatting and content information 212 discussed above in connection with FIG. 2.

The process 800 may identify relevant ads (820) based on the ad targeting request. This may involve searching the ad repository 136 for ads. The searching may involve searching for ads that are relevant to publisher content requested by a user. Relevant ads may be determined based on specific advertiser settings and instructions, and/or they may be determined using one or more matching processes that match ads to context, geographic location, language, and other criteria. In some implementations, the backend systems 118 in the AMS 106 may identify relevant ads.

Once relevant ads are identified, the process 800 may apply approval decision filtering (830). This can involve determining whether or not to serve or deliver the identified ads based on approval decisions and rules. Applying approval decision filtering (830) can involve filtering identified ads and blocking the serving of ads based on decisions and rules from publishers and/or advertisers. The approval decision filtering may be based on manual and rule-based ad/advertiser approval decisions by publishers to which the identified ads may be targeted. Additionally or alternatively, the approval decision filtering may be based on manual and rule-based publisher approval decisions by advertisers associated with the identified ads or other ads.

In some examples, applying approval decision filtering (830) may involve whitelist-based filtering and/or blacklist-based filtering. This can involve maintaining one or more lists of approved advertisers and/or ads (creatives or ad groups) as well as one or more lists of disapproved advertisers/ads. In some implementations, the process 800 can involve maintaining one or more lists of approved publishers and one or more lists of disapproved publishers. The process 800 may maintain different lists of approved/disapproved advertisers for different publishers. The process 800 may maintain different lists of approved/disapproved publishers for different advertisers and/or ads. The various lists may represent manual approvals/disapprovals and/or automated, rule-based approvals/disapprovals.

In some implementations, when applying the approval decision filtering, the process 800 may determine whether the targeted publisher participates in ad reviewing. If the publisher does not participate, then the process 800 may perform whitelist-based filtering on the identified ads. The process 800 can decide to serve none of the identified ads if there are no whitelist matches. If the targeted publisher participates in ad reviewing, then the process 800 may execute one or more filtering rules, in order to apply approval decision filtering (830). The filtering rules may include blocklist rules, ad blacklist rules, advertiser blacklist rules and score-based filtering rules.

The blocklist rules can include rules that block ads based on URLs, phrases, and other blocking criteria set by the targeted publisher or at the global system level. The process 800 can decline to serve any of the identified ads blocked by the blocklist rules.

The ad blacklist rules can include rules that block ads based on blacklists of disapproved ads. These ad blacklists may include lists of ads that have been manually disapproved by the targeted publisher. The blacklists may be generated and maintained, for example, by the backend processing systems 118. If any of the identified ads match the ad blacklist rules, then those ads may be declined for serving.

The advertiser blacklist rules can include rules that block ads based on blacklists of disapproved advertisers. These advertiser blacklists may include lists of advertisers that have been manually disapproved by the targeted publisher. The blacklists may be generated and maintained, for example, by the backend processing systems 118. If any of the identified ads are associated with advertisers matching the advertiser blacklist rules, then those ads may be declined for serving.

The score-based filtering rules can include rules that block ads based on ad/advertiser scores and information in the ad targeting request. The score-based filtering rules may be generated and maintained, for example, by the backend processing systems 118. If any of the identified ads match the score-based rules, then those ads may be declined for serving. The score-based filtering rules may act as fail-through rules if none of the other filtering rules match the identified ads.

In some implementations, when applying the approval decision filtering, the process 800 may determine whether advertisers participate in publisher reviewing. If a particular advertiser does not participate, then the process 800 may perform whitelist-based filtering on identified ads associated with the advertiser. The process 800 can decide to serve none of the identified ads associated with the non-participating advertiser to a targeted publisher if the targeted publisher is not found on a whitelist. If the advertiser participates in publisher reviewing, then the process 800 may execute one or more filtering rules, in order to apply approval decision filtering (830). The filtering rules can include publisher blocklist rules, publisher blacklist rules and publisher score-based filtering rules.

Publisher blocklist rules can include rules that block the serving of ads to publishers based on various criteria set by advertisers or at the global system level (e.g., a default setting). The process 800 can decline to serve any of the identified ads blocked by the blocklist rules. Publisher blacklist rules can include rules that block publishers based on blacklists of disapproved publishers. These blacklists may include lists of publishers that have been manually disapproved by advertisers. If a targeted publisher matches the publisher blacklist rules for a given advertiser/ad, then identified ads may be declined for serving to the publisher. Publisher score-based filtering rules can include rules that block publishers based on publisher scores and information in the ad targeting request.

After applying approval decision filtering, the process 800 may serve the identified ads based on results of the filtering (840). This may involve serving to the targeted publisher or user access device those ads of the ads identified in stage 820 that have not been declined for serving by the various approval decision filtering rules. In some examples, the ad serving system 120 in the AMS 106 may serve to the targeted publisher or user access device the identified ads that pass through the approval decision filtering.

In some implementations, the process 800 may involve offline decision making and online decision making. After ad reviews are aggregated, there may be many ads/advertisers having associated aggregated scores. These aggregated scores, however, will be global scores for the ad/advertiser, not publisher-level scores. The global scores therefore may not be meaningful in determining which ads can be served to which publishers. To determine which ads can be served to which publishers, the process 800 may employ offline decision making and online decision making.

For each publisher, there will be two sets of ads/advertisers: (1) the ad review set that the publisher has seen, which can be the historical ad population; and (2) the remaining inventory of ads that can be served based on ad targeting. For the first set, the process 800 can make explicit decisions based on approval rules setup by the publisher and/or manual approval decisions made by the publisher. When an ad is not covered by any rule or manual approval decision, then that ad can be automatically approved if a certain period of time elapses between insertion of the ad in the publisher's ad review set and this approval time. This decision can be considered an offline decision, since it is a decision made before ad serving time. Eventually, there will be a specific decision for each ad in the ad review set—either a rule-based decision, a manual decision or an automatic default decision. These decisions can be reflected in ad-level blacklists (if disapproved) and ad-level whitelists (if approved).

For the second set (the remaining inventory of servable ads), the process 800 can use publisher-specified rules, along with other filters (e.g., blocklist filters), to make decisions as to whether ads will be served to a publisher. These decisions can be considered online decisions, as they occur at ad serving time. In this fashion, the process 800 may utilize online and offline decision making to determine which ads can be served to which publishers.

In some implementations, the process 800 may involve offline decision making and online decision making with respect to publisher reviews, in order to determine which ads can be served to which publishers.

The illustrated sequences of events in FIGS. 3, 7 and 8 are examples and not intended to be limiting. Other processes may therefore be used and, even with the processes depicted in FIGS. 3, 7 and 8, the illustrated events and their particular order in time may vary. Further, the illustrated events may overlap and/or may exist in fewer steps. Moreover, certain events may not be present and additional events may be included in the illustrated processes.

The displays 400, 500 and 600 in FIGS. 4, 5 and 6 are examples only and not intended to be restrictive or limiting. The number, identity and arrangement of elements in the example displays are not limited to what is shown FIGS. 4-6, and additional and/or different elements may be presented. Further, the displays may include fewer elements than what is illustrated.

For example, in alternative configurations, the display 400 can include layered HTML select boxes in which users can select approval settings for ads and advertisers. As an example, three layers of HTML select boxes can be displayed. The first layer can allow users to select either Approve, Disapprove or Hold. The second layer can allow users to choose feedback (e.g., advertiser is competitor, advertiser is a client, advertiser is not relevant to publisher audience, etc.). The second layer can also allow users to indicate that there is problem with a specific ad. The selection can trigger a third later that allows the user to select the problem with the ad (e.g., content is offensive, not relevant, look and feel does not fit publisher site, etc.).

Example Data Processing System Configuration

Figure 9:
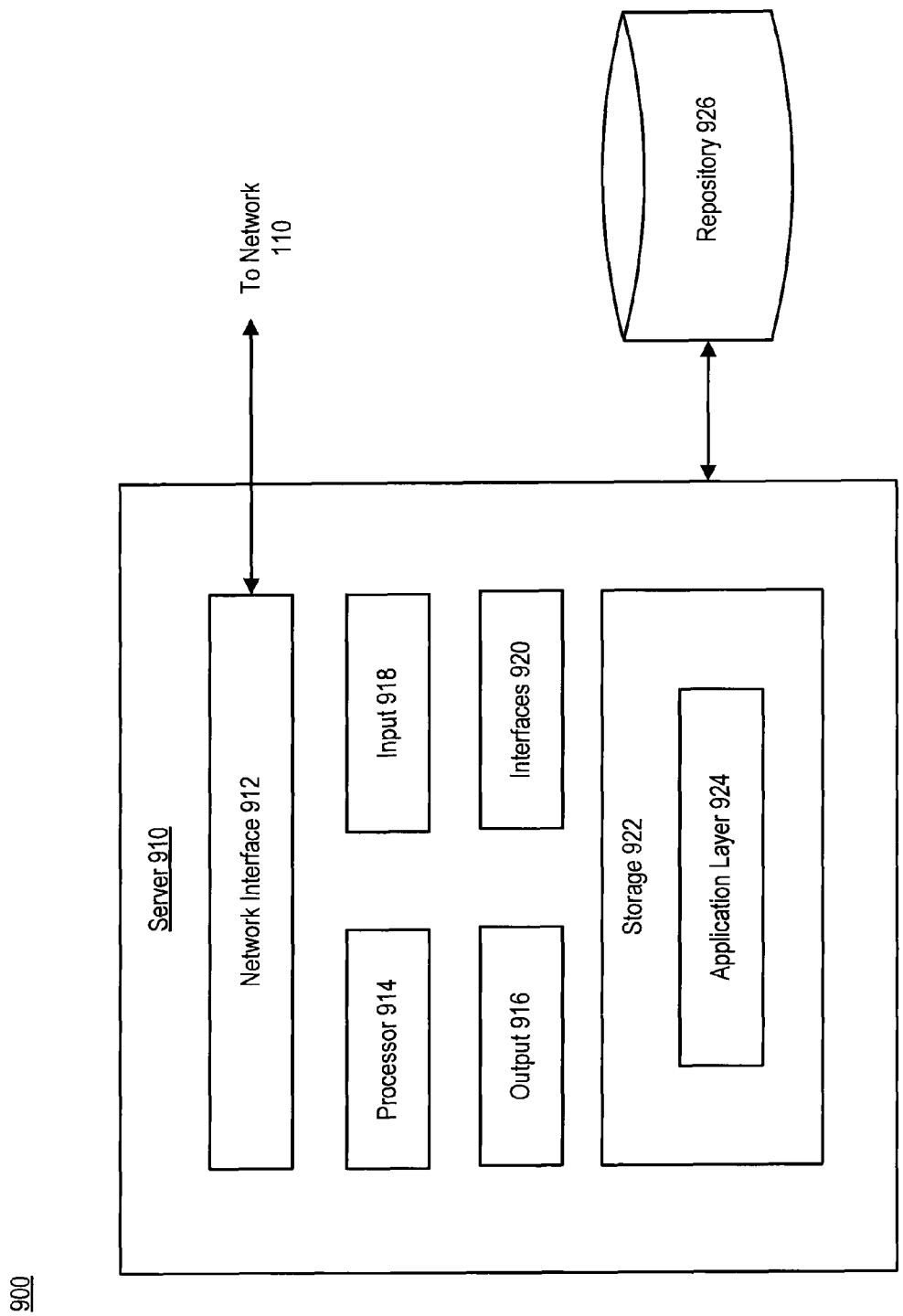
FIG. 9 is a block diagram of an example data processing system configuration.

FIG. 9 illustrates an example configuration 900 of a server system 910. In some implementations, the data processing systems 112, 114 and 116 depicted in FIG. 1 could be configured in a manner consistent with configuration 900. The configuration 900 is an example only, and the systems 112, 114 and 116 could be configured in other ways. Further, each of the servers could have its own individual structure and configuration. Moreover, as noted above, the functions provided by the systems 112, 114 and 116 could be performed by a single server computer or could be performed by a single server process running on a single computer.

In the configuration 900, the server 910 may include various components, such as a network interface 912, a processor 914, an output 916, an input 918, interfaces 920, and a storage 922. One or more system buses (not illustrated) may interconnect these components. The number, identity and arrangement of elements in the configuration 900 are not limited to what is shown, and additional and/or different elements may be contained in or coupled to the elements shown. Further, configuration 900 may include fewer components than what is illustrated.

The network interface 912 may facilitate connectivity with a network, such as the network 110. Network interface 912 may be any appropriate wireline (e.g., IEEE 1394, USB, etc.) or wireless (e.g., IEEE 802.11™, Bluetooth®, IrDA®, etc.) mechanism for facilitating unidirectional or bidirectional transmission of data between the server 910 and a network. The network interface 912 may include one or more network cards and/or data and communication ports.

The processor 914 routes information among components and executes instructions from storage 922. Although FIG. 9 illustrates a single processor, the server 910 may include any number of general- and/or special-purpose processors. The processor 914 may be implemented, for example, using one or more commercially available INTEL® processors.

The output 916 may present text, images, video, audio, or any other type of information. Examples of the output 916 include, video display devices, audio display devices, printers, and the like. The output 916 may display user interface information for various software applications running on the server 910, as well as the operating system programs necessary to operate the system. The output 916 may present information by way of a cathode ray tube, liquid crystal, liquid crystal on silicon, light-emitting diode, gas plasma, laser, or other type of display mechanism. The output 916 could also be configured to receive, generate and/or present holographic or other visual representations. The output 916 may be configured to audibly present information, and it may include suitable components for receiving and presenting audio signals. Although FIG. 9 illustrates a single output 916, the server 910 may include any number of similar or different output devices.

The input 918 may include components such as a keyboard, a mouse, a pointing device, a joystick, and/or a touch screen. The input 918 may also include audio- or video-capture devices (e.g., video cameras, microphones, etc.) and/or various sensors for sensing emissions (e.g., thermal, motion, sound, etc.). It may also include one or more information reading devices (e.g., scanners, disk drives, etc.) and/or input ports. Although FIG. 9 depicts the input 918 as a single discrete element, the server 910 may include any number of similar or different input devices. For example, the server 910 could include a keyboard and a mouse as well as a video-capture device, a scanner and several disk drives.

A user of the server 910 may input commands to control and operate functionality of the server 910 by way of the output 916 and the input 918. These commands may, for example, be input by way of user manipulation of physical controls, such as a keyboard or mouse. The user may input commands to select and manipulate graphics and text objects presented on the output 916 in order to operate and control the server 910.

The interfaces 920 may include various interfaces for facilitating bidirectional or unidirectional communication between the server 910 and one or more peripheral or other devices. The peripheral devices may include, for example, output devices (e.g., a monitor, a printer, a speaker, etc.), input devices (e.g., a keyboard, a mouse, a scanner, etc.), or any other device operable to connect to the server 910. The interfaces 920 may include a combination of hardware, software and/or firmware components. The interfaces 920 may include various connection ports, such as USB, RS-232, RS-485, Fibre Channel, Ethernet, IEEE 1394, RG-6, and/or TOSLINK®.

The storage 922 may provide mass storage and/or cache memory for the server 910. The storage 922 may be implemented using a variety of suitable memory elements. The memory elements may include, for example, solid state elements, optical elements, polymer elements, magnetic elements, and/or organic elements (e.g., crystals). The memory elements may be volatile or non-volatile and may be randomly or sequentially accessed. The storage 922 may include random access memory (RAM), flash RAM, read-only memory (ROM), erasable programmable read-only memory (EPROM), and electrically erasable programmable read-only memory (EEPROM). The storage 922 may include one or more fixed disk drives (e.g., a hard drive, RAID storage, etc.) and one or more removable disk drives (e.g., a CD-ROM drive, DVD drive, etc.). Although a single storage module is shown, the server 910 may include any number of individually configured storage modules.

The storage 922 may store program code for various applications, an operating system (e.g., Windows® XP, Linux® OS), an application-programming interface, application routines, middleware components, and/or other executable instructions. The storage 922 may include program code and information for communications (e.g., TCP/IP communications), middleware components, kernel and device drivers, invariant low-level systems code, data for basic input and output, and various configuration information.

The storage 922 may maintain an application layer 924, which may include various software programs and modules. Such programs and modules could be transferred to a hard drive (not shown) in the storage 922 by way of network transmissions (e.g., an Internet download) and/or removable disks (also not shown), such as a CD-ROM or DVD.

In the configuration 900, the server 910 may be coupled to one or more repositories 926. In some examples, the repositories 124, 126, 136 and 146 may be implemented in a manner consistent with the repositories 926. The repository 926 may include any structured collection or aggregation of information that is stored and accessible. In some implementations, the repositories 926 may include one or more structured data archives distributed among one or more network-based data processing systems. The repositories 926 may include one or more schemas for organizing stored information. In some examples, the repositories 926 may include one or more relational databases and systems, distributed databases, object-oriented databases, and/or any other types of databases. Examples of databases include Oracle® databases, IBM DB2® systems, MySQL® databases, XML databases, and the like. Although illustrated as coupled to the server 910, the repositories 926 could be distributed and/or included in various systems and/or networks.

Example Application Layer Configuration

Figure 10:
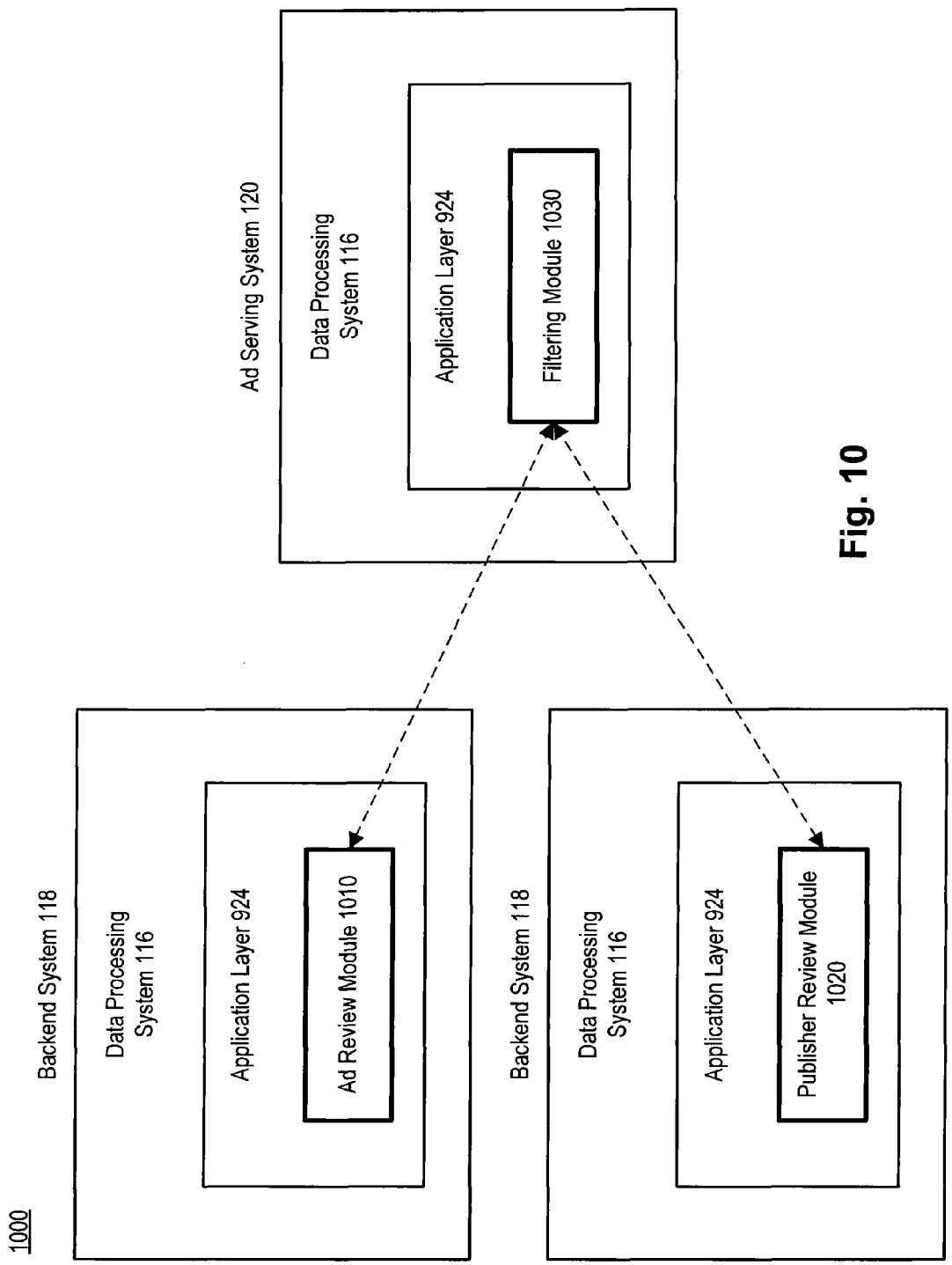
FIG. 10 is a block diagram of an example application layer configuration.

FIG. 10 is a block diagram of an example application layer configuration 1000, which may be maintained in the AMS 106. The configuration 1000 may represent the configuration of one or more application layers 924 of one or more data processing systems 116 maintained by the AMS 106. As illustrated in FIG. 10, the application layer configuration 1000 may include an ad review module 1010, a publisher review module 1020, and a filtering module 1030. As illustrated, the review modules 1010 and 1020 can be located in separate backend systems 118 and the filtering module 1030 can be located in the ad serving system 120.

The particular arrangement illustrated in FIG. 10 is an example only, and other arrangements are possible. For example, the review modules 1010 and 1020 can be co-located in a single data processing system 116 while the filtering module 1030 can be located in a different data processing system. As another example, the modules 1010, 1020 and 1030 can all be co-located in a single data processing system 116. In some examples, the various functionality of the modules 1010, 1020 and 1030 can be distributed or exist in more or less modules that what is illustrated in FIG. 10.

The modules 1010, 1020 and 1030 may include and/or use one more data structures as well as one or more computational algorithms that may operate on various data. The modules may include sets of instructions for performing various tasks, and the modules may output information for use by users or other systems. In some implementations, the modules may include one or more engines, which may output code (e.g., source code, HTML, etc.) that serves as input to other systems, engines or processes.

The modules 1010, 1020 and 1030 may be implemented using any programming or other language suitable for controlling behavior of a system, such as a computer. In some examples, the modules 1010, 1020 and 1030 may be implemented using one or more of C/C++, Java, Visual Basic, eXtendible Markup Language (XML), HTML and other languages.

Although depicted within software application layers 924, the modules 1010, 1020 and 1030 could include and/or be coupled to various hardware elements (within or external to the data processing system(s)). For example, the modules could include one or more neural networks, which may employ software and hardware processing elements or agents linked together. In some examples, the modules could include or use one more embedded systems, such as microcontrollers, routers, etc.

The ad review module 1010 may be configured to provide various functionality associated with allowing the publishers 104 to review ads and advertisers and effect manual and rule-based approval decisions. The ad review module 1010 may (independently or in conjunction with other systems and modules) compile sets of ads to display to publishers, compute economic measures (e.g., ECPM calculations) for display alongside the ads, receive and aggregate approval/disapproval decisions, present aggregated results to publishers, and receive approval decisions (e.g., score-based rules) based on the aggregates. In some implementations, the module 1010 may provide features associated with AdWords™ and/or AdSense™ provided by Google, Inc. In some implementations, the module 1010 (independently or in conjunction with other systems and modules) may perform aspects of the process 300. The ad review module 1010 may be configured with executable instructions that perform aspects of the process.

The publisher review module 1020 may be configured to provide various functionality associated with allowing the advertisers 102 to review the publishers 104 and effect manual and rule-based approval decisions. The publisher review module 1020 may (independently or in conjunction with other systems and modules) compile sets of publishers to display to advertisers, compute economic measures (e.g., ECPM calculations) for display alongside the publishers, receive and aggregate approval/disapproval decisions, present aggregated results to advertisers, and receive approval decisions (e.g., score-based rules) based on the aggregates. In some implementations, the publisher review module 1020 may be configured to provide features associated with AdWords™ and/or AdSense™ provided by Google, Inc. In some implementations, the publisher review module 1020 (independently or in conjunction with other systems and modules) may perform aspects of the process 700. The publisher review module 1020 may be configured with executable instructions that perform aspects of the process.

The filtering module 1030 may be configured to provide functionality associated with effecting ad approval decisions at the ad serving level. For example, the module 1030 may perform approval decision filtering to determine which ads to serve to which publishers based on manual or rule-based approval decisions made by the targeted publishers and/or relevant advertisers/ads. The filtering module 1030 may interact with (e.g., receive input from) the ad review module 1010 and the publisher review module 1020. The filtering module 1030 may be configured to be agnostic with respect to targeting types (e.g., static and dynamic) when effecting serving decisions. In some implementations, the filtering module 1030 (independently or in conjunction with other systems and modules) may perform aspects of the process 800. The filtering module 1030 may be configured with executable instructions that perform aspects of the process.

In some implementations, the ad review module 1010 and the publisher review module 1020 may perform various reviewing functionality (such as compiling review sets, aggregating decisions, performing EPCM calculations, etc.) offline, e.g., separate from real-time ad serving. The review modules 1010 and 1020 may perform reviewing functionality periodically, for example, weekly, daily, or hourly. Various frequencies can be used, and different operations can occur at different frequencies. In some examples, the particular frequency for a given operation can be fixed or adjustable and it can default to a preset value under certain conditions (e.g., at initialization or absent user input). The filtering module 1030 may perform online or real-time ad serving functionality based on the offline processing performed by the ad review module 1010 and the publisher review module 1020.

Example User Access Device Configuration

FIG. 11 is a block diagram of an example configuration 1100 of the user access devices 108 in environment 100. The number, identity and arrangement of elements in the configuration 1100 are not limited to what is shown, and additional and/or different elements may be contained in or coupled to the elements shown. The configuration 1100 is an example only, and the user access device 108 could be configured in other ways.

In the example configuration 1100, the user access devices 108 may include various components, such as a network interface 1112, a processor 1114, an output 1116, an input 1118, interfaces 1120, and a storage 1122, which may maintain an application layer 1124. The components illustrated in FIG. 11 (i.e., 1112, 1114, 1116, 1118, 1120, 1122, and 1124) may be similar in structure and functionality to those components described in connection with FIG. 9 (i.e., 912, 914, 916, 918, 920, 922, and 924). In some implementations, however, one or more of the user access devices 108 may include components that are structurally and functionally different from those described in connection with FIG. 9. For example, the user access devices 108 may be configured with different (e.g., less) storage capacity and different application layers than the server system. In some examples, the application layer 1124 in a user access device may include one or more modules configured to present various viewers (e.g., browsers) to users. The application layer 1124 may also include one or more modules for interacting with other elements (e.g., data processing systems 112, 114 and/or 116), receiving and processing ads, and/or combining received ads with received content for presentation to users.

The user access devices 108 could also be configured with less or different processing capabilities than that of the server system. In some examples, the user access devices 108 may include various user interface components (e.g., keypads, display devices, speakers, microphones, etc.) while the server system may lack such (or even any) user interface components. In some examples, the server system 910 could be a general purpose server while the user access devices 108 could include embedded systems optimized with specific components for performing specific tasks.

The foregoing description does not represent an exhaustive list of all possible implementations consistent with this disclosure or of all possible variations of the implementations described. Other implementations are within the scope of the following claims.

What is claimed is:

1. A computer-implemented method, comprising:
    receiving, from a plurality of advertisers, a plurality of reviews of a content publisher, the content publisher publishing content to which advertisements are targeted over a distribution network;
    generating, on a server system, an aggregated approval score of the content publisher based on the received reviews of the content publisher, wherein the aggregated approval score is based at least in part on a weighting of the plurality of received reviews of the content publisher from the plurality of advertisers, the weighting based on at least one of: revenue associated with each advertiser providing the received review, size of each advertiser providing the received review, geographic location of each advertiser providing the received review, amount of traffic associated with each advertiser providing the received review, and tier of each advertiser providing the received review;
    providing the aggregated approval score to a selected advertiser; and
    receiving, from the selected advertiser, an indication to accept or reject the targeting of the advertisements to the publisher content, the indication being received after providing the aggregated approval score to the selected advertiser.

2. The method of claim 1,
    wherein at least some of the received reviews reflect a basis for an approval of the content publisher.

3. The method of claim 1,
wherein at least some of the received reviews reflect a basis for an objection to the content publisher.

4. The method of claim 1, further comprising:
presenting to advertisers an expected earning associated with targeting an advertisement to the content publisher.

5. The method of claim 4,
wherein the received review or other reviews are based on the expected earning.

6. The method of claim 4,
wherein the received indication to accept or reject the targeting of the advertisements to the publisher content is based on the expected earning.

7. The method of claim 1,
wherein receiving an indication to accept or reject the targeting of the advertisements to the publisher content comprises:
receiving an automated decision from a network, the automated decision based on approval rules.

8. The method of claim 1, further comprising:
targeting the advertisements to the publisher content based on the received indication to accept or reject the targeting of the advertisements to the publisher content.

9. The method of claim 1,
wherein providing the aggregated approval score to the advertiser comprises providing the approval score based on a threshold.

10. A computer-implemented method, comprising:
receiving an advertisement targeting request from an advertisement distribution network, the targeting request including information associated with content available from an online content publisher;
identifying relevant advertisements to target to the content based on the targeting request, the identified advertisements being associated with online advertisers;
applying, on a server system, approval decision filtering to the identified relevant advertisements, the approval decision filtering reflecting approval decisions to accept or reject advertisements for presentation with the content, the approval decisions being received from the advertisers after providing aggregated ratings of the online content publisher to the advertisers, the aggregated ratings generated based on reviews of the online content publisher received from advertisers, wherein the reviews are weighted based on one or more characteristics describing the advertisers; and
serving one or more of the identified relevant advertisements to the content based on results of the approval decision filtering.

11. The method of claim 10,
wherein applying approval decision filtering comprises accessing a stored whitelist of approved online content publishers.

12. The method of claim 10,
wherein applying approval decision filtering comprises accessing a stored blacklist of rejected online content publishers.

13. The method of claim 10,
wherein applying approval decision filtering comprises blocking the serving of an identified relevant advertisement to the content.

14. The method of claim 10,
wherein receiving an advertisement targeting request comprises receiving information associated with a requested web page available from the online content publisher.

15. The method of claim 10,
wherein identifying relevant advertisements comprises accessing a database storing online advertisements.

16. A system, comprising:
a publisher review module configured for receiving, from a plurality of advertisers, a plurality of reviews of a content publisher, the content publisher publishing content to which advertisements are targeted over a distribution network;
means for generating an aggregated approval score of the content publisher based on the received reviews of the content publisher, wherein the received reviews are weighted based on one or more characteristics describing the plurality of advertisers;
a module configured for providing the aggregated approval score to the a selected advertiser; and
means for receiving, from the selected advertiser, an indication to accept or reject the targeting of the advertisements to the publisher content, the indication being received after providing the aggregated approval score to the selected advertiser.

17. A system comprising an advertisement management system, the advertisement management system configured to:
receive, from a plurality of advertisers, a plurality of reviews of a content publisher, the content publisher publishing content to which advertisements are targeted over a distribution network;
generate an aggregated approval score of the content publisher based on the received reviews of the content publisher, wherein the received reviews are weighted based on one or more characteristics describing the plurality of advertisers;
provide the aggregated approval score to a selected advertiser; and
receive, from the selected advertiser, an indication to accept or reject the targeting of the advertisements to the publisher content, the indication being received after providing the aggregated approval score to the selected advertiser.

18. A computer readable medium storing a computer program, the computer program including instructions that, when executed, cause at least one processor to:
receive, from a plurality of advertisers, a plurality of reviews of a content publisher, the content publisher publishing content to which advertisements are targeted over a distribution network;
generate an aggregated approval score of the content publisher based on the received reviews of the content publisher, wherein the received reviews are weighted based on one or more characteristics describing the plurality of advertisers;
provide the aggregated approval score to a selected advertiser; and
receive, from the selected advertiser, an indication to accept or reject the targeting of the advertisements to the publisher content, the indication being received after providing the aggregated approval score to the selected advertiser.

* * * * *